United States Patent
Matsuda et al.

(10) Patent No.: US 7,120,910 B2
(45) Date of Patent: Oct. 10, 2006

(54) CONTROL METHOD FOR IMAGE PROCESSING APPARATUS CONNECTABLE TO COMPUTER NETWORK

(75) Inventors: Hiroshi Matsuda, Kanagawa (JP); Yukiyoshi Hikichi, Tokyo (JP); Tomoya Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 09/818,558

(22) Filed: Mar. 28, 2001

(65) Prior Publication Data

US 2001/0029521 A1 Oct. 11, 2001

(30) Foreign Application Priority Data

Mar. 29, 2000 (JP) ............................. 2000-092158
Apr. 11, 2000 (JP) ............................. 2000-109922
Apr. 19, 2000 (JP) ............................. 2000-118041

(51) Int. Cl.
*G06F 9/00* (2006.01)
*G06F 9/44* (2006.01)
*G06F 15/16* (2006.01)

(52) U.S. Cl. .................. 718/102; 718/100; 709/201; 709/223; 399/8; 715/740

(58) Field of Classification Search ........ 718/100–108; 399/8; 909/201–238; 715/740
See application file for complete search history.

(56) References Cited

U.S. PATENT DOCUMENTS

| | | | | |
|---|---|---|---|---|
| 5,493,408 A * | 2/1996 | Kurogane et al. | .......... | 358/296 |
| 5,567,068 A * | 10/1996 | Egashira et al. | ............. | 400/625 |
| 5,727,135 A * | 3/1998 | Webb et al. | ................ | 358/1.14 |
| 5,758,081 A * | 5/1998 | Aytac | ......................... | 709/212 |
| 5,774,660 A * | 6/1998 | Brendel et al. | ............. | 709/201 |
| 5,867,636 A | 2/1999 | Walker | ........................ | 395/114 |
| 5,873,659 A * | 2/1999 | Edwards et al. | .............. | 400/61 |
| 5,907,410 A | 5/1999 | Ohtake | ........................ | 358/468 |
| 5,909,493 A | 6/1999 | Motoyama | .................... | 380/25 |
| 6,020,973 A | 2/2000 | Levine et al. | .............. | 358/1.15 |
| 6,067,559 A * | 5/2000 | Allard et al. | ............... | 709/202 |
| 6,085,220 A * | 7/2000 | Courts et al. | ............... | 709/201 |
| 6,139,177 A | 10/2000 | Venkataman et al. | ....... | 364/188 |
| 6,184,996 B1 * | 2/2001 | Gase | ......................... | 358/1.15 |
| 6,333,789 B1 * | 12/2001 | Shima | ........................ | 358/1.15 |
| 6,453,127 B1 * | 9/2002 | Wood et al. | .................. | 399/8 |
| 6,469,796 B1 * | 10/2002 | Leiman et al. | ............. | 358/1.15 |
| 6,785,023 B1 * | 8/2004 | Iida | ............................ | 358/442 |
| 6,894,793 B1 * | 5/2005 | Roosen et al. | ............. | 358/1.15 |

(Continued)

FOREIGN PATENT DOCUMENTS

EP 0 867 799 A2 9/1998

(Continued)

*Primary Examiner*—Lewis A. Bullock, Jr.
(74) *Attorney, Agent, or Firm*—Fitzpatrick, Cella, Harper & Scinto

(57) ABSTRACT

A Web server function is provided for an image processing apparatus including a scanner for reading an image on a document, a printer for printing an image, an E-mail transmission/reception function, a FAX transmission/reception function, and the like to make the image processing apparatus generate a list of information about the status of various jobs and image data stored in a storage unit as a Web page. A user can browse and operate this Web page by using the Web browser of a computer connected to the apparatus through a LAN. The user of the computer can therefore grasp and manipulate information about a plurality of jobs executed by the image processing apparatus and information about image data at a remote place from the image processing apparatus.

9 Claims, 30 Drawing Sheets

U.S. PATENT DOCUMENTS

| | | | |
|---|---|---|---|
| 6,983,415 B1 * | 1/2006 | Shima | 715/501.1 |
| 2002/0036793 A1 * | 3/2002 | Roosen et al. | 358/1.15 |
| 2005/0219607 A1 * | 10/2005 | Yamaguchi et al. | 358/1.15 |

FOREIGN PATENT DOCUMENTS

| | | |
|---|---|---|
| EP | 0 867 817 A2 | 9/1998 |
| EP | 0 882 580 A2 | 12/1998 |
| EP | 0 886 206 A2 | 12/1998 |
| JP | 11289413 | 4/1998 |
| JP | A-11-175445 | 7/1999 |
| WO | WO 99/15955 | 4/1999 |

* cited by examiner

FIG. 9

Device Name : Nameless Device
Product Name : XXX Alpha 01
Location : OA Corner
Remote UI Last Modified : 1998/10/18 13:55:38
○ Printer Status : Lower TONER
○ Scanner Status : Ready
○ Fax Status : Ready Comment :
123

Administrator : Tomoaki Endoh
Support Link : http://cpca.cse.xxx.co.jp

Device — 103
Job Status — 104
Mail Box — 105
Address — 106
Add. Func. — 107

▶ Send Mail

DOCUMENT : DONE 101
102

FIG. 28

CONTROL METHOD FOR IMAGE PROCESSING APPARATUS CONNECTABLE TO COMPUTER NETWORK

FIELD OF THE INVENTION

The present invention relates an image processing apparatus which can be used while being connected to a computer network to which a plurality of computers can be connected, and a control method therefor.

BACKGROUND OF THE INVENTION

Conventionally, to notify a user of the various status of an image processing apparatus such as a copying machine or facsimile apparatus, various types of display are performed on the display unit of an operation panel provided for the apparatus body.

In one system, a host computer is connected to these apparatuses to allow a user to display the status of each apparatus on the display unit of the host computer by using unique application software installed in the host computer without going to the apparatus.

Recently, attempts have been made to develop multifunction apparatuses by, for example, realizing a plurality of functions, e.g., copier, printer, and facsimile functions, in a single apparatus. To notify the user of the status of such an apparatus by displaying it on a host computer, complicated software to be installed in the host computer must be designed. In addition, every time the arrangement of the apparatus is changed, new software must be designed on the host computer side, demanding enormous efforts.

Furthermore, the user must launch different types of application software for the respective apparatuses, requiring cumbersome operation and imposing a heavy load on the host computer.

Moreover, when the user makes various settings in apparatuses or giving various operation instructions to them, he/she must learn different operation methods for the respective apparatuses. The user may experience difficulty in learning the methods.

SUMMARY OF THE INVENTION

It is an object of the present invention to provide an image processing apparatus from which the above problems are eliminated, and a control method for the apparatus.

It is another object of the present invention to provide an image processing apparatus to which various instructions can be given on a host computer by using general-purpose application software, and a control method for the apparatus.

It is still another object of the present invention to provide an image processing apparatus to which various instructions can be given from a host computer by providing a Web server function to the apparatus and using general-purpose Web client software, and a control method for the apparatus.

It is still another object of the present invention to provide an image processing apparatus which allows a user to easily grasp the execution status of jobs in the apparatus capable of executing a plurality of functional jobs, and a control method for the apparatus.

It is still another object of the present invention to provide an image processing apparatus which allows a user to grasp the status of data input from the reader of the apparatus, received by facsimile, and stored in the storage unit of the apparatus, and to easily manipulate the data from a host computer, and a control method for the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9 to 12, 14 to 19, 22, and 24 to 28 are views showing example windows displayed on the Web browser;

DETAILED DESCRIPTION OF THE PREFERRED EMBODIMENTS

The embodiments of the present invention will be described in detail below with reference to the accompanying drawings.

[First Embodiment]

In a system in which an image processing apparatus is connected to a host computer via a transmission medium such as a network, a log of image output jobs input to the image output device of the image processing apparatus to output images can be acquired/displayed on the host computer.

Figure 1:
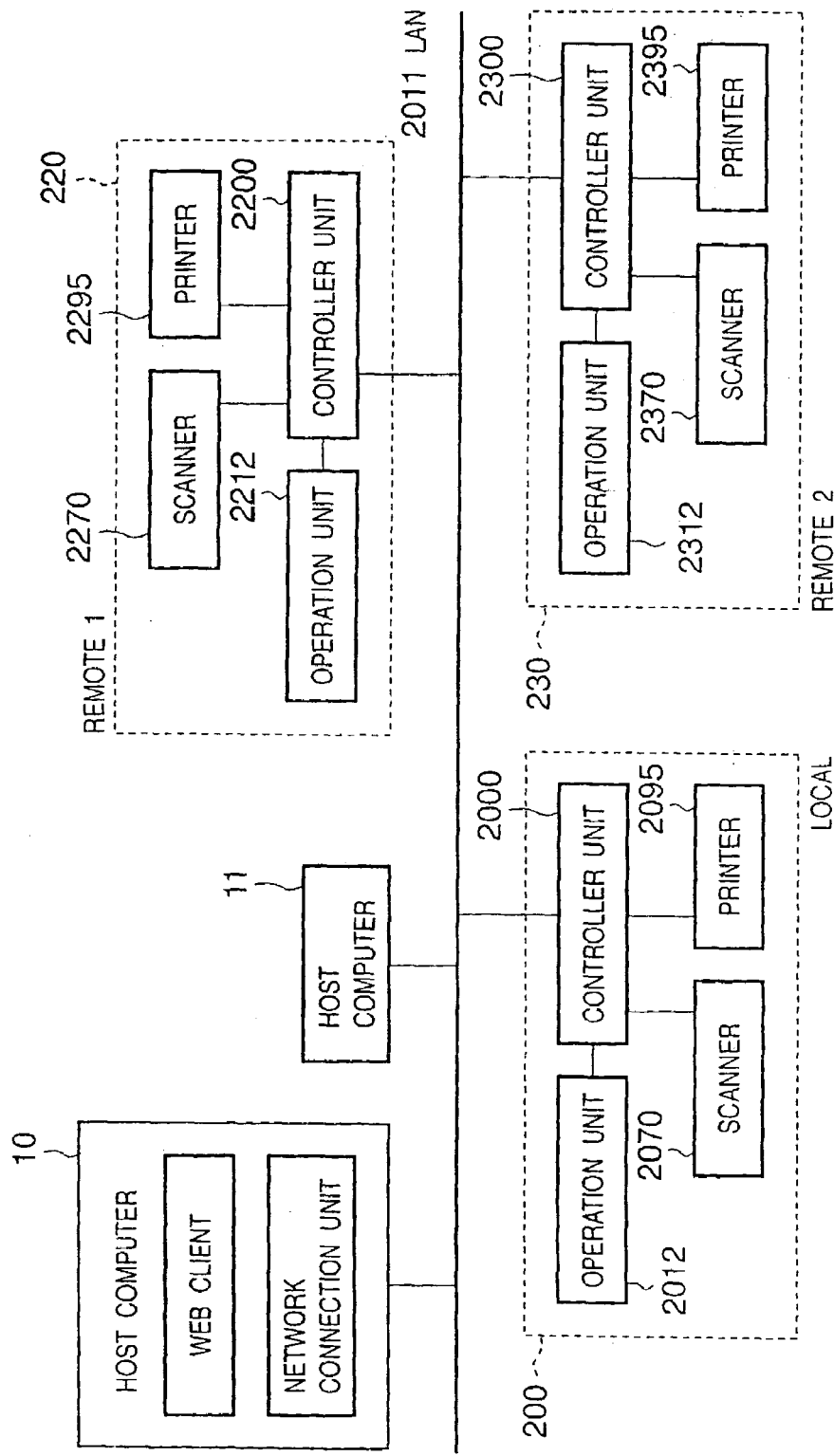
FIG. 1 is a block diagram showing an example of system configuration according to the first embodiment of the present invention.

FIG. 1 is a block diagram for explaining the overall configuration of a system according to this embodiment. An image processing apparatus 200 includes a scanner 2070 serving as an image input device, a printer 2095 serving as an image output device, a controller unit 2000 constituted by a memory and the like, an operation unit 2012 serving as a user interface, and the like. The scanner 2070, printer 2095, and operation unit 2012 are connected to the controller unit 2000. The controller unit 2000 is connected to a LAN 2011 or the like to which TCP/IP can be applied, and serves as a Web server to generate a Web page (HTML file) and send the data to a WWW (Word Wide Web) network by HTTP (Hyper Text Transfer Protocol). Image processing apparatuses 220 and 230 each having the same arrangement as that of the image processing apparatus 200 are connected to the LAN 2011. The image processing apparatuses 220 and 230 respectively have scanners 2270 and 2370, printers 2295 and 2395, and operation units 2212 and 2312, which are connected to control units 2200 and 2300. (Since these image processing apparatuses have the same arrangement, the image processing apparatus 200 will be exemplified below unless otherwise specified.)

Reference numeral 10 denotes a host computer (personal computer), which is connected to a network such as the LAN 2011 via a network connection unit. The number of image processing apparatuses is not limited to three, and many apparatuses can be connected to the network. As will be described below, a Web browser is installed in the host computer 10 to allow it to operate as a Web client. Information based on an HTML file received from an image processing apparatus is displayed on the display of the host computer. A host computer 11 has the same arrangement as that of the host computer 10. The number of host computers is not limited to two, and many host computers can be connected to the network. (Since these host computers have the same arrangement, the host computer 10 will be exemplified below unless otherwise specified.)

Figure 2:
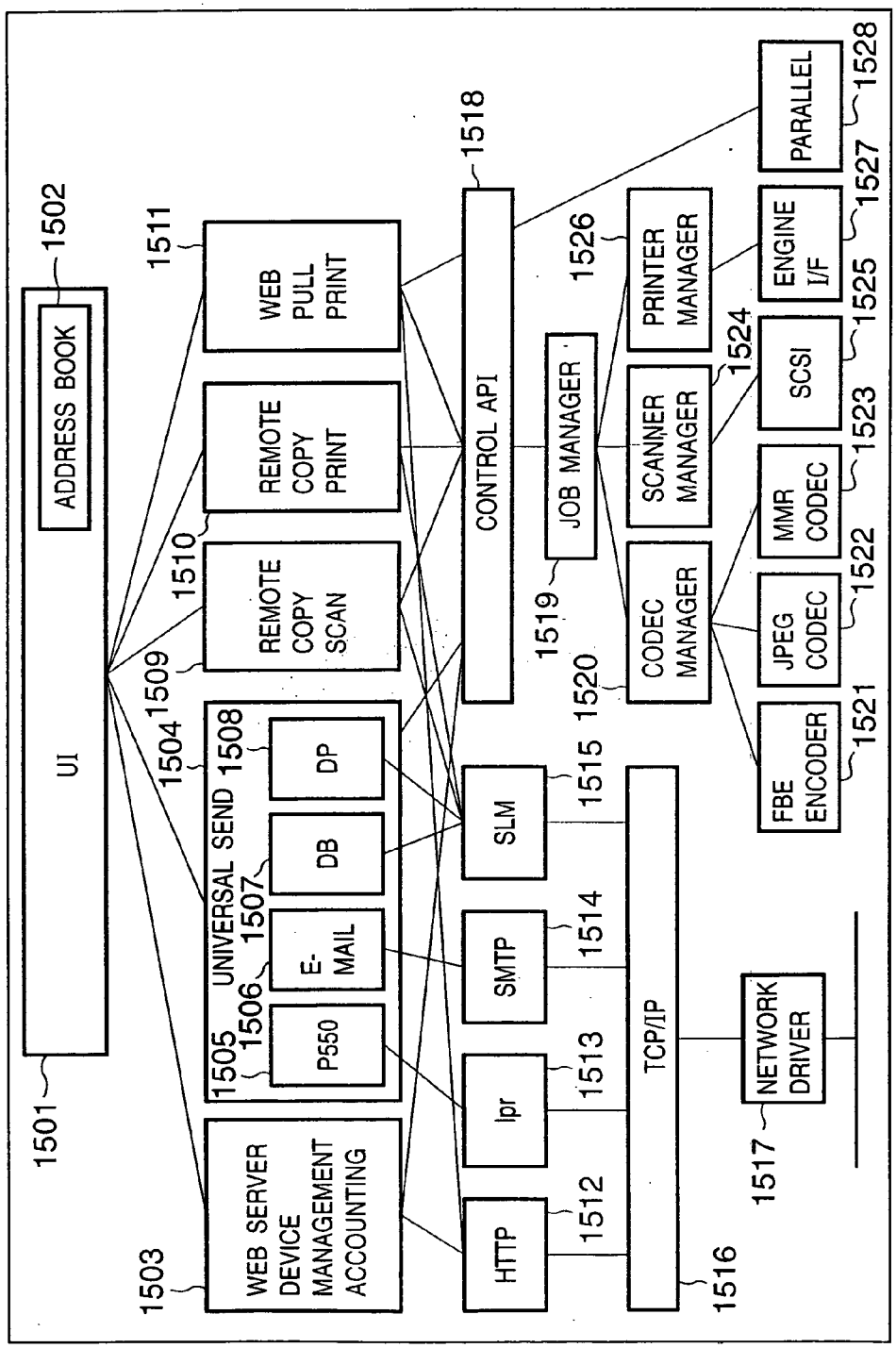
FIGS. 2 and 13 are block diagrams showing the software arrangements of image processing apparatuses according to the first and second embodiments of the present invention.

FIG. 2 is a block diagram showing a software arrangement implemented in a control unit for the image processing apparatus 200 or the like according to the first embodiment.

Reference numeral 1501 denotes a user interface (to be referred to as a UI hereinafter), which is a module for interfacing between this image processing apparatus and user operation when the user performs various operations/settings with respect to the apparatus by using the operation unit 2012. This module transfers input information to various types of modules (to be described later) in accordance with operation by the operator, thereby requesting processing, setting data, and the like.

Reference numeral 1502 denotes an address book, i.e., a database module for managing delivery destinations, communication destinations, and the like of data. When the UI 1501 detects the operation performed through the operation unit 2012 to add, delete, and acquire data, the contents of the address book 1502 are used to give the delivery/communication destination information of data to each module to be described later in accordance with operation by the operator.

Reference numeral 1503 denotes a Web server module, which is used to notify management information on the local image processing apparatus in response to a request from a Web client (e.g., the host computer 10). This management information is read through a universal send module 1504, remote copy scan module 1509, remote copy print module 1510, and control API 1518, all of which will be described later, and sent to the Web client through an HTTP module 1512, TCP/IP communication module 1516, and network driver 1517, all of which will be described later. The Web server module 1503 generates information to be passed to the Web client as data in so-called Web page (home page) form, e.g., HTML form. Java, a CGI program, or the like is used as needed.

The universal send module 1504 is a module taking charge of distribution of data, and distributes data designated by the operator through the UI 1501 to designated communication (output) destinations. When the operator gives an instruction to generate distribution data by using the scanner function of the local image processing apparatus, the scanner 2070 of the image processing apparatus is operated through the control API 1518 to generate data. Reference numeral 1505 denotes a module which is executed when a printer is designated as an output destination in the universal send module 1504; 1506, a module which is executed when an E-mail address is designated as a communication destination in the universal send module 1504; 1507, a module which is executed when a database is designated as an output destination in the universal send module 1504; and 1508, a module which is executed when an image processing apparatus similar to the local image processing apparatus is designated as an output destination in the universal send module 1504.

The remote copy scan module 1509 is a module for performing processing equivalent to the copy function realized by the local image processing apparatus alone (scanner 2070 and printer 2095) when the output destination of image information read by the scanner 2070 using the scanner function of the image processing apparatus is set to the printer 2295 or 2395 of another image processing apparatus connected through a network or the like. The remote copy print module 1510 is a module for performing processing equivalent to the copy function realized by the local image processing apparatus alone by outputting the image information, obtained by using another image processing apparatus (the image information read by the scanner 2270 or 2370) connected through a network or the like as an input source, by using the printer function of the local image processing apparatus. The Web pull print module 1511 is a module for reading out information on a home page on the Internet or an intranet upon designation of a URL and printing it by using the printer 2095.

The HTTP module 1512 is used when the local image processing apparatus performs communication by HTTP, and provides a communication function for the Web server module 1503 and Web pull print module 1511 described above through the TCP/IP communication module 1516 (to be described later). Reference numeral 1513 denotes an lpr module for providing a communication function to the printer module 1505 in the universal send module 1504 through the TCP/IP communication module 1516 (to be described later); 1415, an SMTP module for providing a communication function to the E-mail module 1506 in the universal send module 1504 through the TCP/IP communication module 1516 (to be described later); and 1515, an SLM (Salutation Manager Module) for providing a communication function to the database module 1507, DP module 1508, remote copy scan module 1509, and remote copy print module 1510 in the universal send module 1504 through the TCP/IP communication module 1516.

The TCP/IP communication module 1516 provides a network communication function to each module described above by using the network driver 1517 (to be described later). The network driver 1517 controls a portion physically connected to the network.

The control API 1518 provides an interface between upstream modules such as the universal send module 1504 and downstream modules such as a job manager 1519 (to be described later) so as to reduce the dependency between the upstream and downstream modules, thereby improving the diversity of each module. The job manager 1519 interprets the processing designated by each module described above through the control API 1518, and gives an instruction to each module (1520, 1524, 1526) (to be described later). The job manager 1519 also performs centralized management of various jobs executed in the local image processing apparatus, including control on a FAX job.

Reference numeral 1520 denotes a CODEC manager for managing/controlling various data compression/decompression processes of the processes designated by the job manager 1519; 1521, an FBE encoder for compressing the data read by scanning performed by the job manager 1519 and a scan manager 1524 (to be described later) according to an FBE format; 1522, a JPEG CODEC for performing JPEG compression of read data and JPEG decompression of print data in scanning executed by the job manager 1519 and scan manager 1524 and printing executed by a print manager 1526; and 1523, an MMR CODEC for performing MMR compression of the data read by the scanner and MMR decompression of print data in scanning executed by the job manager 1519 and scan manager 1524 and printing executed by the print manager 1526.

The scan manager 1524 manages/controls the scan processing designated by the job manager 1519. Reference numeral 1525 denotes a SCSI driver for communicating with the scan manager 1524 and the scanner 2070 internally connected to the local image processing apparatus. The print manager 1526 manages/controls print processing designated by the job manager 1519. Reference numeral 1527 denotes an engine I/F for providing an I/F between the print manager 1526 and the printer 2095; and 1528, a parallel port driver for providing an I/F when the Web pull print module 1511 outputs data to an output device (not shown) through a parallel port.

The address book 1502 will be described in detail below. This address book 1502 is stored in a nonvolatile storage unit (a nonvolatile memory, hard disk, or the like) in the image processing apparatus 200. In the address book 1502, the features of other devices connected to the network are described, which include, for example:

the formal or alias names of the devices;
the network addresses of the devices;
network protocols that can be handled by the devices;
document formats that can be handled by the devices;
compression types that can be handled by the deices;
image resolutions that can be set for the devices;
paper sizes that can be set for devices serving as printers and paper feeding stage information; and
the names of folders that can store documents when devices server as server (computer).

Each application to be described below can discriminate the features of distribution destinations on the basis of information described in the address book 1502.

The image processing apparatus 200 can transmit data by referring to the address book 1502. For example, a remote copy application discriminates resolution information (indicating resolution that can be handled) on a device designated as a distribution destination by referring to the address book 1502. This application then compresses the binary image, read by the scanner, by a known MMR compression technique in accordance with the resolution information, formats it by a known TIFF (Tagged Image File Format) technique, and transmits the resultant data to a printer on the network. Although a detailed description of the SLM 1515 will be omitted, it is a kind of known network protocol called a salutation manager including device control information.

Figure 3:
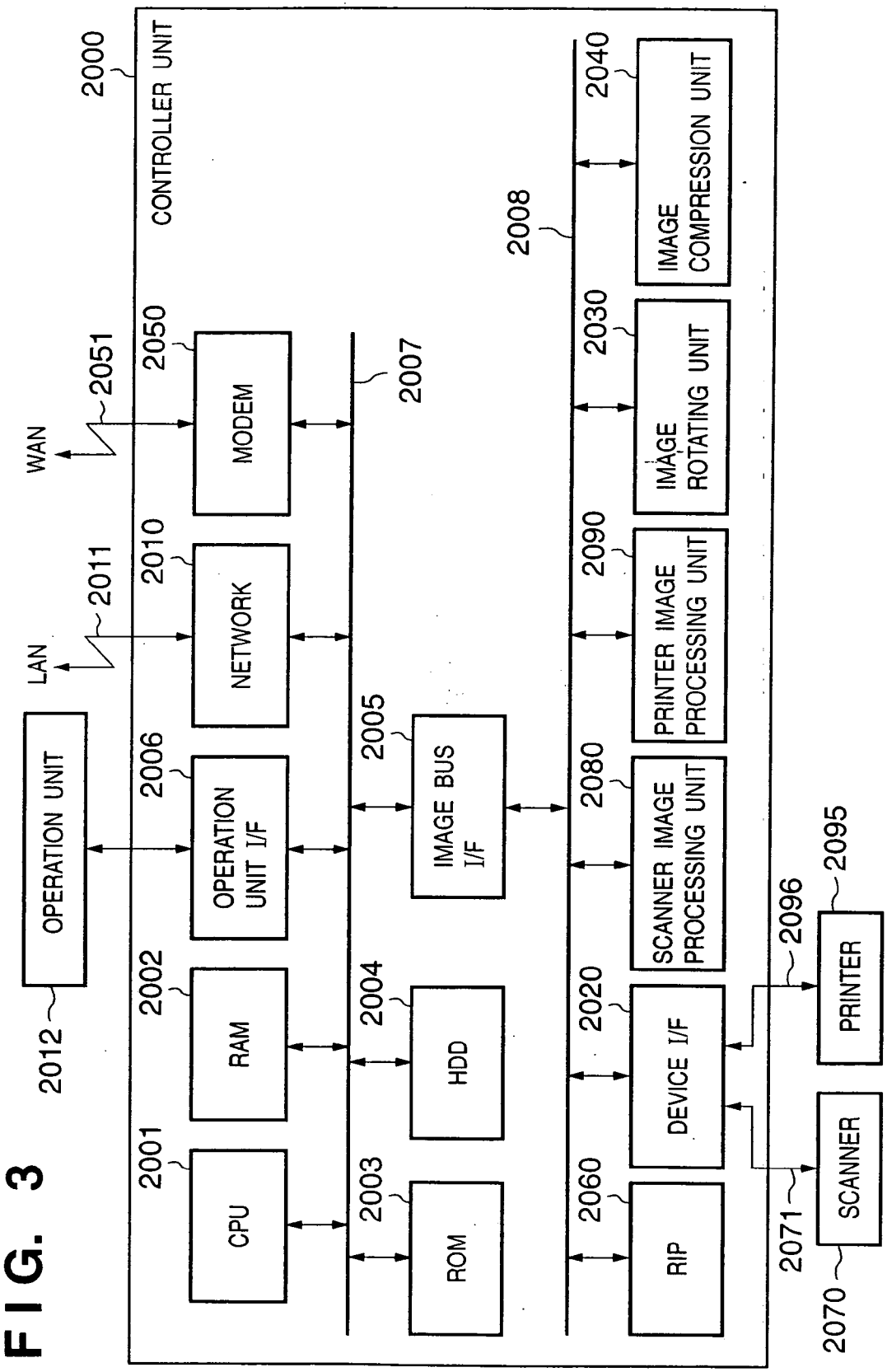
FIG. 3 is a block diagram showing the hardware arrangement of the image processing apparatus according to the first embodiment of the present invention.

FIG. 3 is a block diagram showing the detailed arrangement of the hardware of an image processing apparatus.

The controller unit 2000 is a controller which is connected to the scanner 2070 serving as an image input device and the printer 2095 serving as an image output device and is also connected to the LAN 2011 and a WAN (Wide Area Network) 2051 serving as a telephone network to input/output image information and device information.

A CPU 2001 is a controller for controlling the overall system. A RAM 2002 serves as both a system work memory by which the CPU 2001 operates and an image memory for temporarily storing image data. A ROM 2003 is a boot ROM, in which a boot program for the system is stored. An HDD 2004 is a hard disk drive for storing system control software in FIG. 2 and image data. An operation unit I/F 2006 is an interface unit for the operation unit (UI) 2012, and outputs image data to be displayed on the operation unit 2012 to it. The operation unit I/F 2006 also serves to transmit, to the CPU 2001, the information input by the user of the local image processing apparatus through the operation unit 2012. A network 2010 connects the local image processing apparatus to the LAN 2011 to input/output information in packet form. A MODEM 2050 connects the local image processing apparatus to the WAN 2051 to demodulate/modulate information. The above devices are arranged on a system bus 2007.

An image bus I/F 2005 is a bus bridge for connecting the system bus 2007 to an image bus 2008 for transferring image data at high speed so as to convert a data structure. The image bus 2008 is formed by, for example, a PCI bus or IEEE 1394.

The following devices are arranged on the image bus 2008. A RIP (Raster Image Processor) 2060 analyzes/renders a PDL code to form a bitmapped image. A device I/F 2020 connects the scanner 2070 serving as an image input/output device and the printer 2095 to the controller unit 2000 through signal lines 2071 and 2096, respectively, thereby performing synchronous system/asynchronous system conversion of image data. A scanner image processing unit 2080 corrects, processes, and edits input image data. A printer image processing unit 2090 performs correction, solution conversion, and the like for print output image data to be output to the printer 2095 in accordance with the printer 2095. An image rotating unit 2030 rotates input image data and outputs the resultant data. An image compression unit 2040 performs JPEG compression/decompression processing for multilevel image data, and also performs JBIG, MMR, and MH compression/decompression processing for binary image data.

Figure 4:
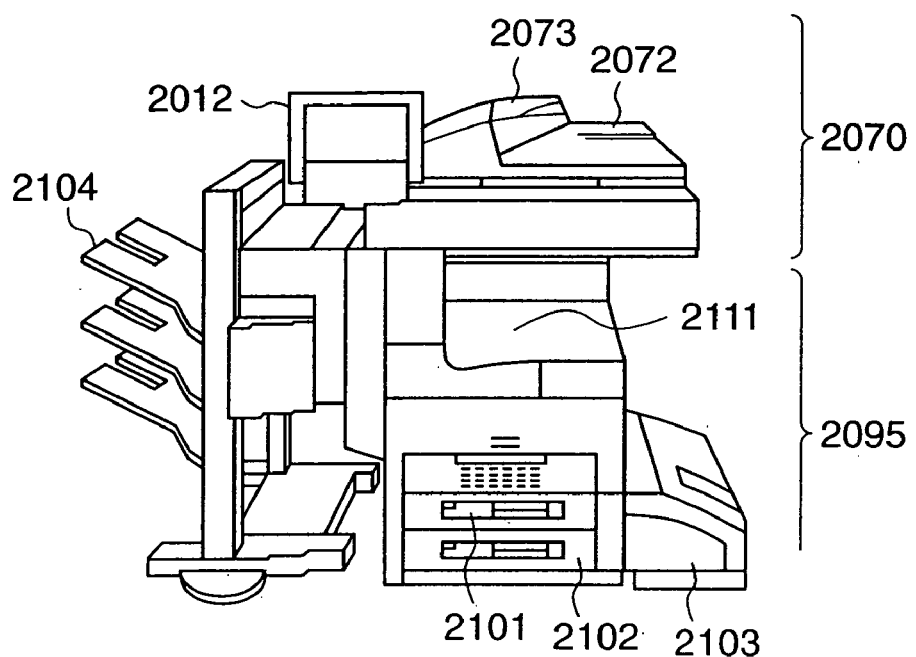
FIG. 4 is a perspective view showing the outer appearance of the image processing apparatus according to the first embodiment of the present invention.

FIG. 4 shows the outer appearance of the image processing apparatus having the above arrangement according to this embodiment.

The operation unit 2012 displays various information and is manually operated by the user. This unit will be described in detail later.

The scanner 2070 serving as an image input device illuminates an image on a book- or sheet-like original with light and scans (main scan) a CCD line sensor constituted by a plurality of light-receiving elements. The scanner 2070 also converts the image into an electrical signal as raster image data with predetermined resolutions (pixel densities) in the main scanning direction and sub-scanning direction in accordance with a designated input form by moving (sub-scanning) an optical system such as a mirror. When a document feeder 2072 is to be used, one or a plurality of sheet-like originals are set on a tray 2073. When the user of the apparatus outputs a read instruction from the operation unit 2012, the controller CPU 2001 instructs the scanner 2070 to read images on originals automatically conveyed one by one onto the original table by the document feeder 2072. At this time, images may be read by moving each original while the optical system is fixed.

The printer 2095 serving as an image output device is a portion for converting raster image data 2096 from various input sources into visualized images on paper sheets. The printer 2095 can use any of the following scheme: the electrophotographic scheme using a photosensitive drum and photosensitive belt, the ink-jet scheme of directly printing images on paper sheets by discharging ink from a small nozzle array, and the like. Note that print operation is started in accordance with an instruction from the controller CPU 2001.

The printer 2095 has a plurality of paper feeding stages to allow selection of one of different paper sizes or directions, and includes paper cassettes 2101 and 2102 and paper deck 2103 in correspondence with the paper feeding stages. The user replenishes paper sheets by pulling each cassette or opening the cover of the deck. Information such as the sizes of paper sheets loaded in each cassette and deck is supplied to the controller CPU 2001 through sensors mounted on each cassette and deck. A paper cassette or deck is selected in accordance with a designated output form to feed a paper sheet. A discharge tray 2111 receives printed paper sheets. In sorting operation, printed paper sheets are discharged onto a sorter 2104 having a plurality of bins, as needed. When paper sheets are discharged onto the sorter 2104, for example, the sheets can be stapled or punched.

Figure 5:
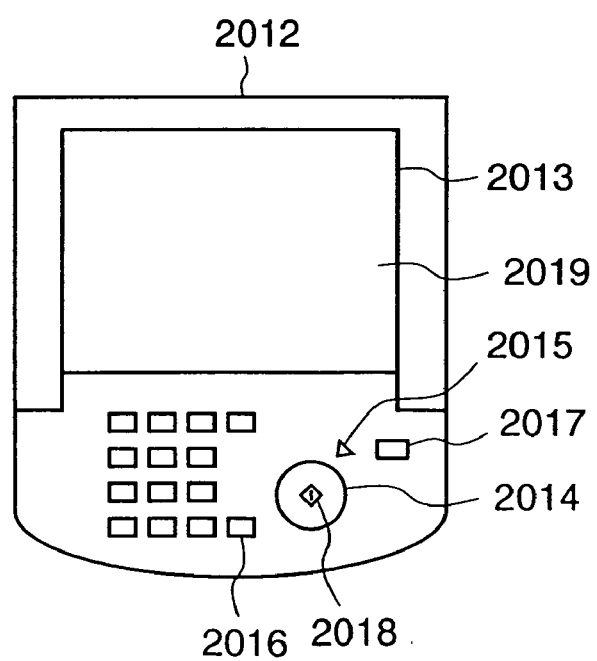
FIG. 5 is a view showing the outer appearance of an operation unit 2012 of the image processing apparatus.

FIG. 5 shows the outer appearance of the operation unit 2012.

The operation unit 2012 has a liquid crystal display unit (LCD display unit), a plurality of hard keys, and an LED display unit.

An LCD display unit 2013 has a touch panel sheet 2019 stuck on a liquid crystal screen. The LCD display unit 2013 displays a system operation window and soft keys, and transmits, to the controller CPU 2001, the position information of a displayed key when it is pressed.

The hard keys include a start key 2014, stop key 2015, ID key 2016, reset key 2017, and the like.

The start key 2014 is used to, for example, start to read an original image. A two-color LED display unit 2018 for displaying green or red is disposed in the central portion of the start key 2014, and the color displayed indicates whether the start key 2014 can be used. If the red light is turned on, the press of the start key 2014 is not accepted. If the green light is turned on, the press of the start key 2014 is accepted. The stop key 2015 is used to stop operation currently performed. The ID key 2016 is used to input the user ID of the user. The reset key 2017 is used to initialize the settings made through the operation unit 2012.

Figure 6:
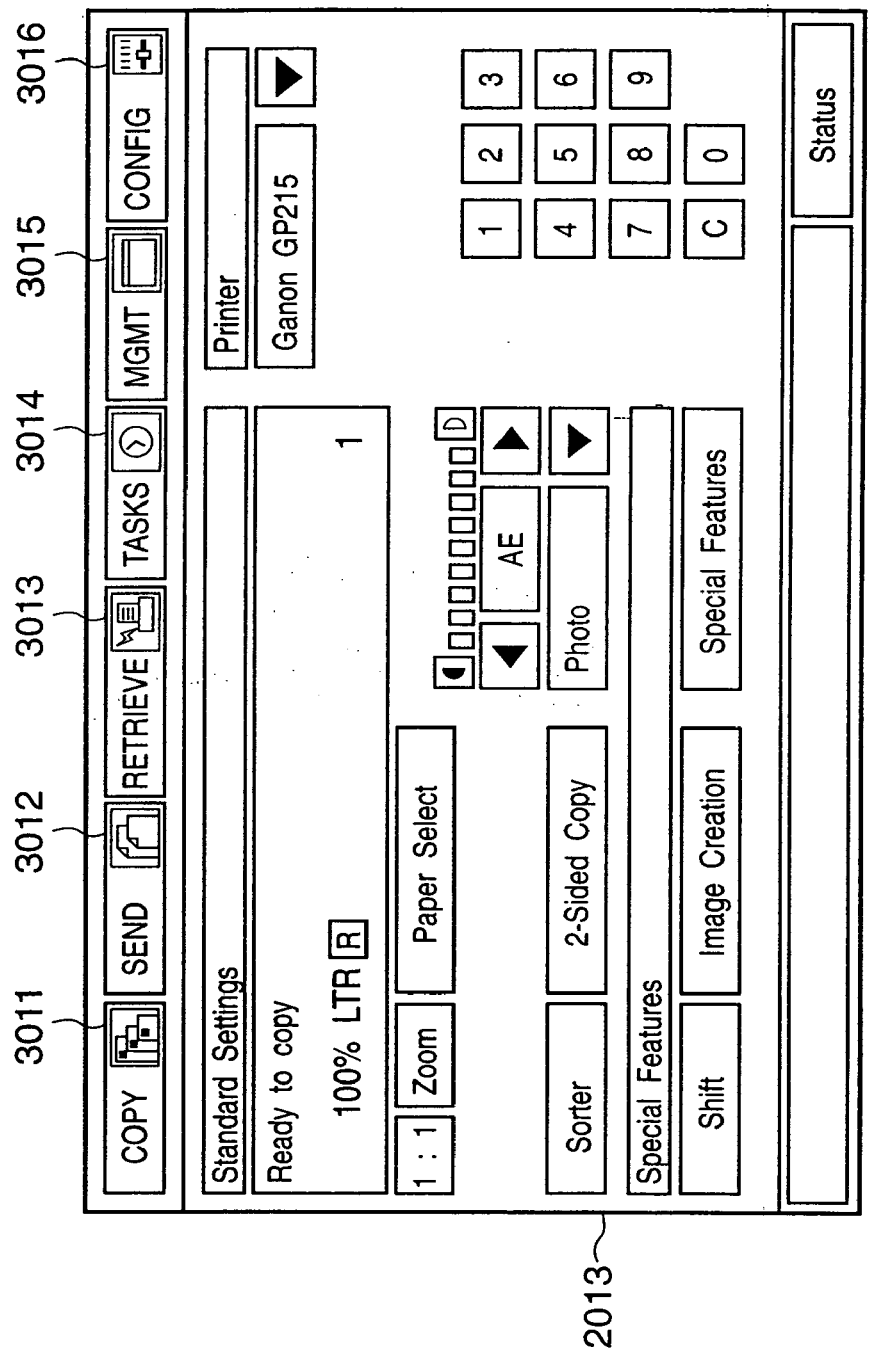
FIG. 6 is a view showing an example display window on a liquid crystal display unit 2013 in the operation unit 2012.

FIG. 6 is a view showing the contents of a basic window displayed on the LCD display unit 2013 of the operation unit 2012.

The functions provided by the image processing apparatus 200 are mainly classified into six categories, namely Copy, Send, Retrieve, Tasks, Management, and Configuration, which respectively correspond to six main tabs (COPY, SEND, RETRIEVE, TASKS, MGMT, and CONFIG) (3011 to 3016) displayed on the upper portion of the operation window 2013. By pressing one of these main tabs, the current window is switched to a window for a corresponding category. If switching to another category is inhibited, the main tag display color changes, and no reaction is made upon pressing any of these tabs.

[COPY] is pressed to switch windows in executing the function of performing normal local copy operation by using the scanner 2070 and printer 2095 of the self-apparatus and the function (remote copy) of copying a document by using the scanner 2070 of the self-apparatus and the printers 2295 and 2395 of the similar remote image processing apparatuses 220 and 230 connected to the self-apparatus through the network.

[SEND] is pressed to switch windows and allow the user to designate a plurality of destinations in executing the function of transferring an image on an original placed on the scanner 2070 of the self-apparatus to the E-mail function, remote printer function, FAX function, file transfer (FTP) function, and database.

[RETRIEVE] is pressed to switch windows in executing the function of acquiring external data through the network or the like and printing it by using the printer 2095 of the self-apparatus. As a method of acquiring data, a method using the WWW, E-mail, file transfer, or FAX can be used.

[TASKS] is pressed to switch windows in executing the function of making various settings for the generation and management of tasks for automatically processing FAX data and external data such as Internet print data and periodically retrieving data.

[MANAGEMENT] is pressed to manage a job address book, bookmark document account information, and the like.

[CONFIGURATION] is pressed to make settings (for, e.g., a network and timepiece) for the self-apparatus.

FIG. 6 shows the [COPY] window.

Figure 7:
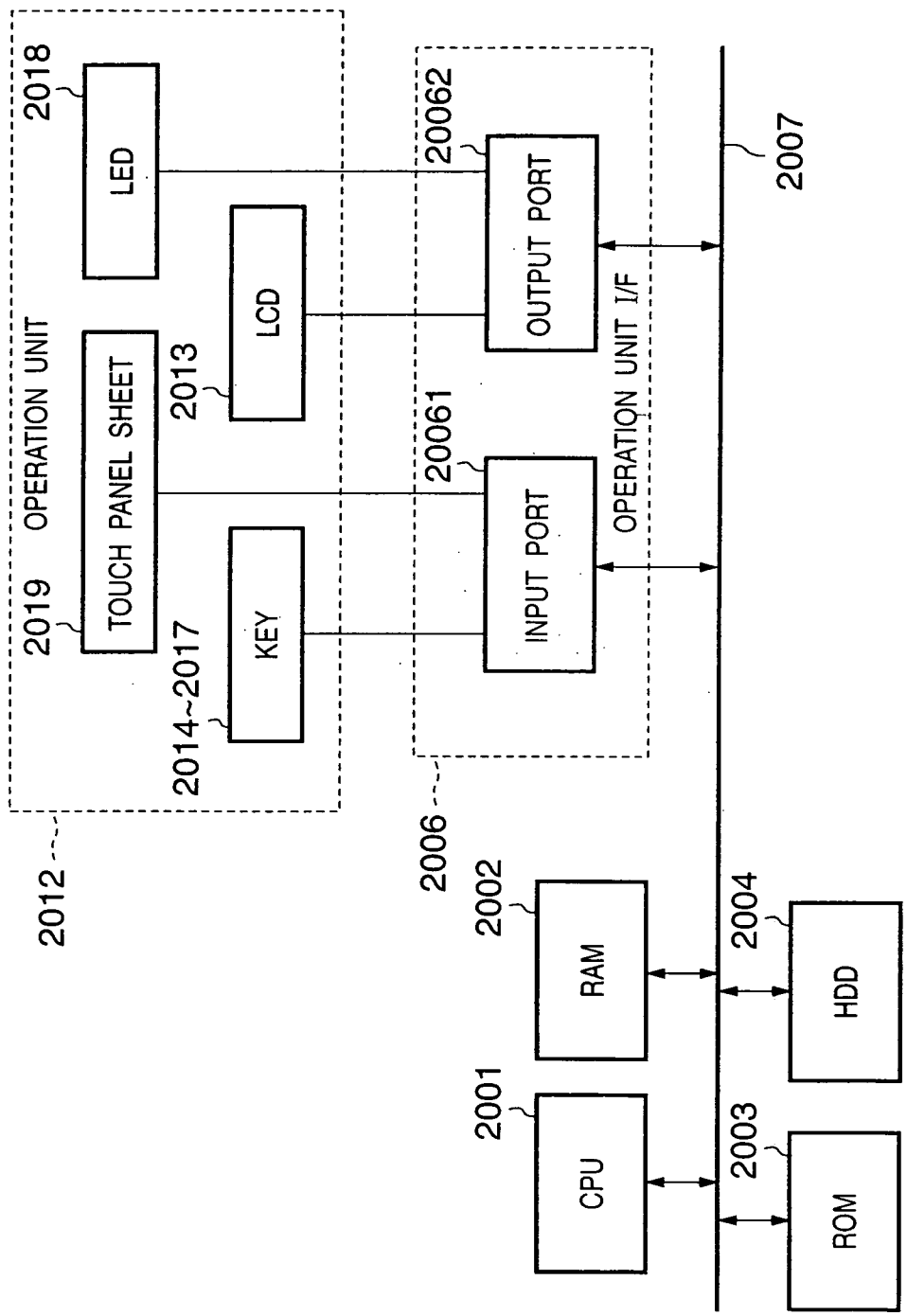
FIG. 7 is a block diagram for explaining the control operation of the operation unit 2012 of the image processing apparatus according to the first embodiment.

FIG. 7 is a block diagram for explaining the control operation of the operation unit 2012 of the image processing apparatus according to this embodiment.

As described above, the operation unit 2012 is connected to the system bus 2007 through the operation unit I/F 2006. The CPU 2001, RAM 2002, ROM 2003, and HDD 2004 are connected to the system bus 2007. The CPU 2001 systematically controls accesses to the respective devices connected to the system bus 2007 on the basis of the control program and the like stored in the ROM 2003 and HDD 2004, thereby reading input information from the scanner 2070 connected through the device I/F 2020 and outputting an image signal as output information to the printer 2095 connected through the device I/F 2020. The RAM 2002 functions as the main memory, work area, and the like of the CPU 2001.

The CPU 2001 acquires user inputs from the touch panel sheet 2019 and various hard keys 2014 and 2017 through an input port 20061. The CPU 2001 generates display window data on the basis of the acquired operation contents and the above control program, and outputs the display window to the LCD display unit 2013 through an output port 20062 for controlling the image output device. The CPU 2001 also controls the LED display unit 2018, as needed.

A remote UI (remote User Interface) which is a characteristic function of this embodiment will be described next.

The remote UI is the function of externally acquiring/setting information such as the status of the local image processing apparatus or making it perform operation such as print operation or transmission (Universal Send). The user can use the function of the remote UI by accessing the local apparatus from a host computer (10, 11) such as a personal computer connected to the network by using a Web browser. This allows the user to perform, through the remote host computer, operation which should be performed through the operation unit 2012.

As shown in FIG. 2, the Web server 1503 operates in the local apparatus to allow communication by HTTP (Hypertext Transfer Protocol). The Web server 1503 can operate a CGI (Common Gateway Interface) program which is launched in accordance with a request from a client. Resource files and page template files are stored in the HDD 2004 in FIG. 3 and used by the remote UI. The resource files include HTML (Hypertext Markup Language) files used for page display, image files, and the like. A template file is a file which is referred to from the CGI program and used to generate a page.

To access the local apparatus, the user directly inputs the URL (Uniform Resource Locator) to the Web browser or select a link in which the URL is embedded. The Web browser transmits an HTTP command for designating a desired URL through a communication path such as the LAN 2011. The Web server 1503 receives this HTTP command, analyzes the HTTP command, and performs corresponding operation.

If the request from the Web browser of the client is not a CGI request, the designated resource of the above resources is transmitted to the Web browser, and the processing is terminated.

If the request from the Web browser is a CGI request, the corresponding CGI program is launched. The CGI program can receive a query parameter when it is launched; the value designated by the user through the browser is handed to the program.

The CGI program requests the apparatus to perform acquisition/setting of apparatus information, printout operation, or the like in accordance with the request. The CGI program also generates a page to be transmitted by using a corresponding template. The template file has a portion in which the description is changed by using acquired information. This makes it possible to generate a page content in accordance with the current status.

The Web browser on the transmitting side displays the page returned from the local apparatus on the display of the host computer to show it to the user. The above page returned to the Web browser contains a script code for prompting the user to check his/her inputs and enter data again if any improper input is found (for example, a value that is not allowed is input).

Accessing the apparatus by using the Web browser in this manner allows the user to externally acquire/set the function/status/hold information of the apparatus or operate the apparatus. The information that can be acquired/set by the remote UI includes apparatus information such as paper sizes that can be used and the remaining quantity of paper sheets, information of jobs entered, document information stored in the storage unit, address information for the E-mail and FAX functions, setting information about a network, and the like. The operations that can be performed through the remote UI include printout operation and transmission of document information held in the device.

Figure 8:
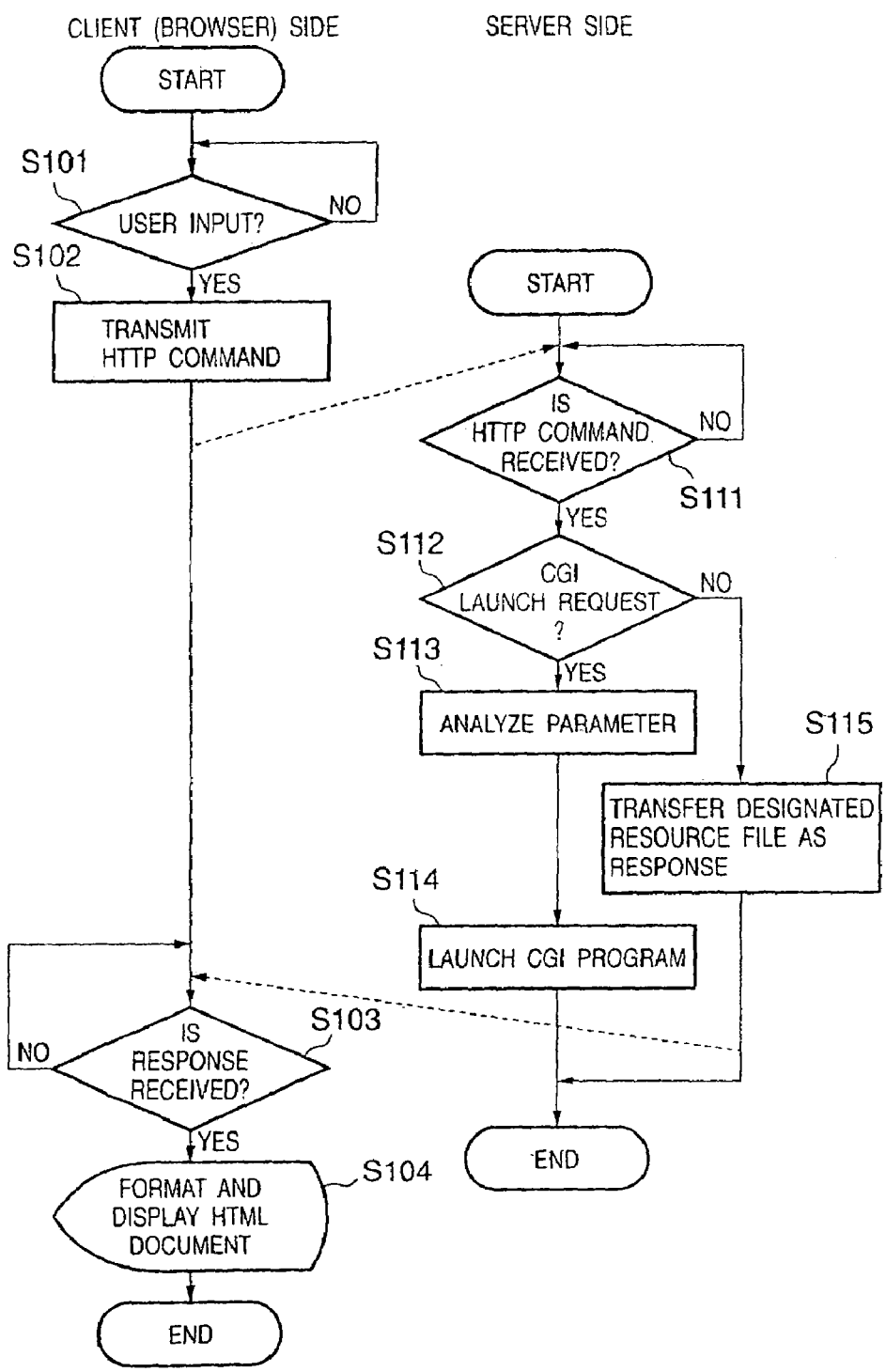
FIG. 8 is a flow chart showing the flows of processing on the host computer (Web browser) side and image processing apparatus (Web server) side in executing a remote UI function.

FIG. 8 is a flow chart showing the flows of basic processing on the client (browser) side (host computers 10 and 11) and the server side (image processing apparatuses 200, 220, and 230). This flow chart shows the flow of processing controlled by the CPU of a host computer on the basis of the browser control program installed in the hard disk of the host computer, and the flow of processing controlled by the CPU 2001 on the basis of the control program for the Web server 1503 which is stored in the HDD 2004 of the image processing apparatus. The same applies to all the flow charts to be described below.

On the client side, in step S101, the CPU waits for the inputting of a URL from the user. If a URL is input, the flow advances to step S102 to transmit an HTTP command to the server side.

In step S103, the CPU waits for the reception of a response from the server side. If a response is received, an HTML document is formatted/displayed in step S104, thus terminating one session.

On the server side, in step S111, the CPU waits for the reception of an HTTP command from the client side. If an HTTP command is received, the CPU checks in step S112 whether the command is a CGI launch request. If the command is a CGI launch request, the CPU analyzes a CGI parameter in step S113. In step S114, the CPU launches the CGI program. One session is then terminated. If it is determined in step S112 that the command is not a CGI launch request, the flow advances to step S115 to return a designated resource file as a response, thus terminating one session.

On many pages, the display contents change depending on the status at the time of display. For this reason, apparatus information is acquired in the launched CGI program and an HTML file is generated from a template file and returned as a response. In step S115, the CPU returns a designated HTML file without processing it.

FIG. 9 is a view showing an example of the page transmitted from the Web server 1503 and displayed on the browser of the host computer in this embodiment. This window shows the top page of the remote UI displayed on a general Web browser. This page is displayed as a default page when the host computer is connected to the Web server 1503 upon designation of the URL of a desired image processing apparatus (inputting of the IP address of the image processing apparatus following http://). As shown in FIG. 9, the window is comprised of two frames, an index area 101 and main area 102. A main site map is displayed in the index area. When a button on the map is pressed (clicked with a pointing device such as a mouse), the corresponding window is displayed in the main area. In displaying pages, the session shown in FIG. 8 is repeated a plurality of number of times, and steps S114 and S115 are executed in the process. In step S104, the host computer 10 displays the HTML file received by a known general browser as shown in FIG. 9.

As shown in FIG. 9, the top page displays the general information of the device.

In "Device Name", the user can set an arbitrary device name. If the user sets no name, "Nameless Device" is set. In "Product Name", the product name of the local image processing apparatus is registered in advance. In "Location", the user arbitrarily sets the location where the local image processing apparatus is installed. The last time this page was rewritten by the Web server 1503 is also displayed. In addition, the status of the printer 2095 of the local image processing apparatus (e.g., the remaining quantity of toner, the presence/absence of paper sheets, and the occurrence of jam), the status of the scanner 2070 (cover open or the like), and the status of the FAX function (e.g., transmission in process, reception in process, or the occurrence of an error) are displayed as character information, in color, and with the outer appearance of the local image processing apparatus. In the comment column, the message set by the operation unit 2012 or through the remote UI with the browser can be displayed. Furthermore, the administrator name can be set. When the user presses (clicks) this portion, a mailer set as a standard function is launched to allow E-mail transmission. When the user presses (clicks) "Support Link", the host computer is connected to a support information page through the Internet of the local image processing apparatus. In the lowest column, the display state of the browser (". . . is open", "Document: Done", or the like) is displayed.

In addition to the above information, a device information page, job status page, box page, address page, user mode page, and the like are displayed by pressing (clicking) a device button (Device) 103, job status button (Job Status) 104, mail box button (Mail Box) 105, address button (Address) 106, and user mode button (Add.Func.) 107 arranged in the index area.

Figure 10:
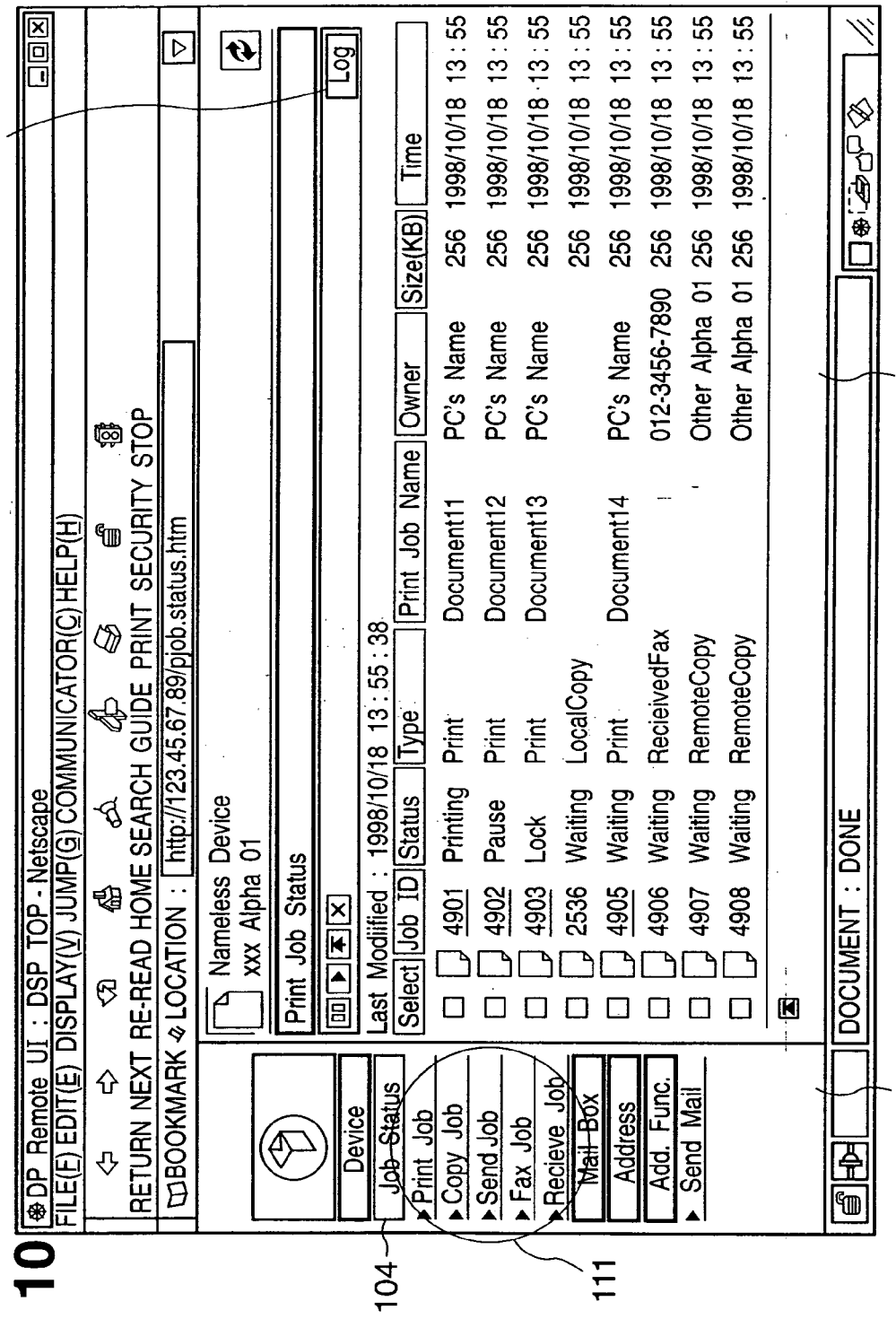

FIG. 10 is a view showing an example of the job status page displayed after the job status button 104 is pressed.

When the, job status button 104 is pressed (clicked), an HTTP command to display a job status page is transmitted to the image processing apparatus 200 (step S102). Upon reception of this command, the image processing apparatus 200 transmits an HTML file in which the display contents shown in FIG. 10 are described (step S115).

The host computer 10 receives this HTML file and analyzes it to display a page like the one shown in FIG. 10 (steps S103 and S104). On the job status page, a list of various job status currently input to the image processing apparatus 200 is displayed. The user can select the types of jobs to be displayed (a print job (Print Job), copy job (Copy Job), transmission job (Send Job), FAX job (Fax Job), and reception job (Receive Job)) from a submenu 111 displayed in the index area 101, and a job status list of selected types of jobs is displayed in the main area 102. FIG. 10 shows a status where a print job is selected to display the status of all jobs using the printer 2095, and a list of print job status is displayed in the main area 102. When a print job log button 112 is pressed, a print job log page is displayed.

Figure 11:
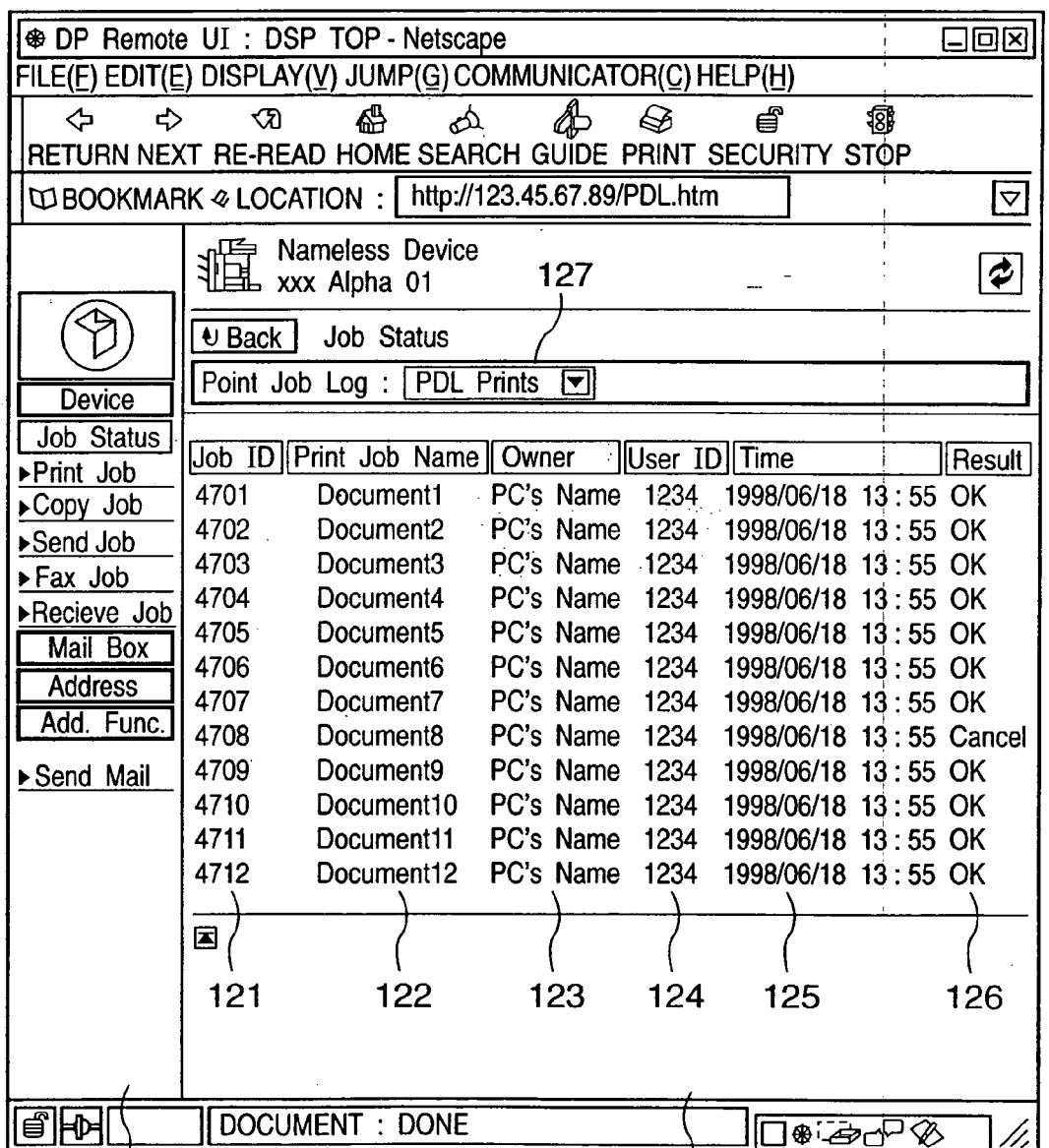

FIG. 11 is a view showing an example display of the print job log page.

Figure 12:
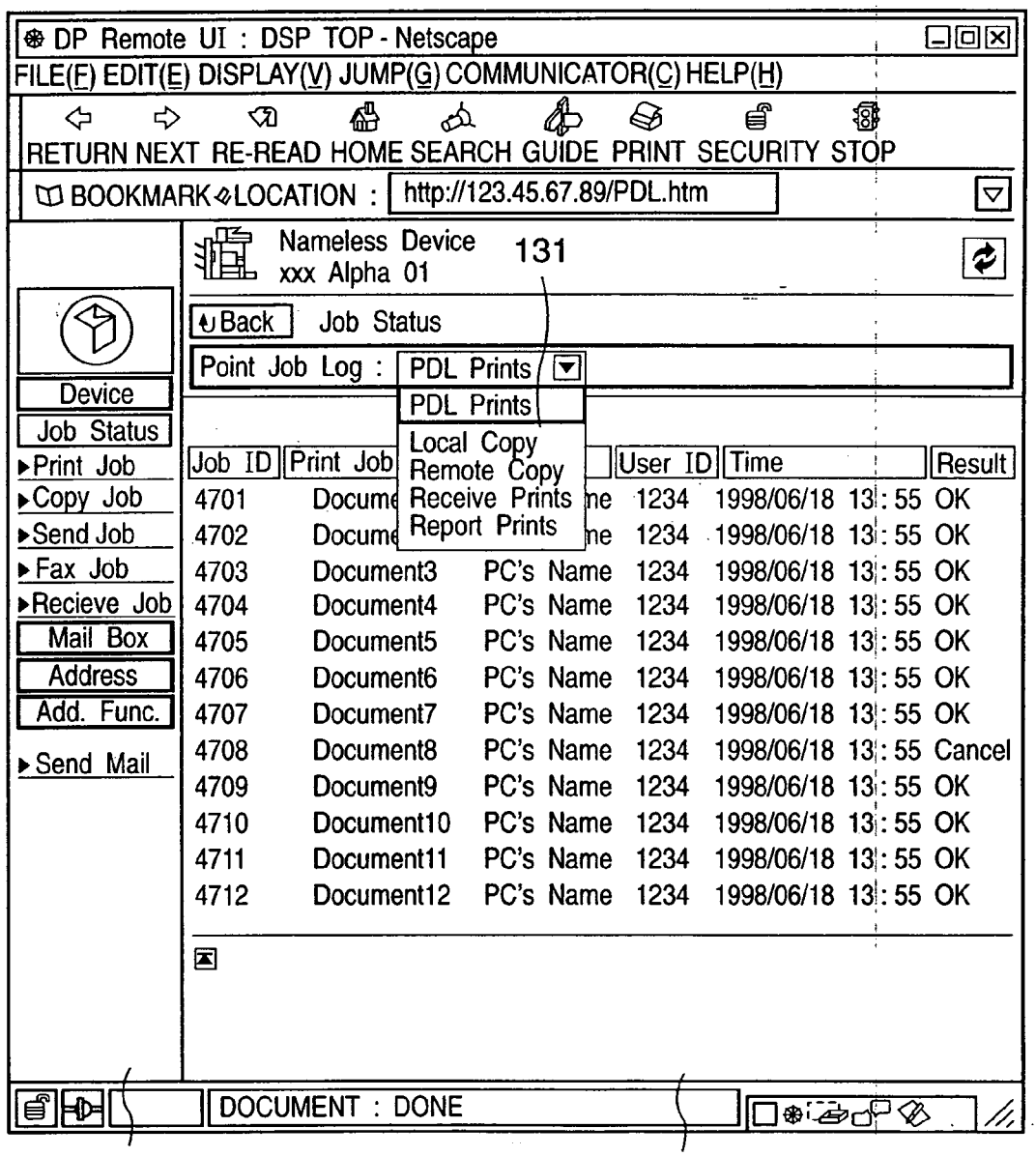

On the print job log page, a log of print jobs input after the system is started is displayed. As shown in FIG. 11, a log of print jobs is displayed in the main area 102, and a job number 121, job name 122, job owner 123, user ID 124, end time 125, and job execution result 126 are displayed as one record for each print job. When a print job type selection button 127 is pressed, a pull-down menu 113 is displayed, as shown in FIG. 12. The user can change job types displayed as a list in the main area 102 by selecting a desired print job type from this pull-down menu. The job types that can be selected include a PDL print job (PDL print: a PDL print job based on PC/PCL, LIPS, or the like; print processing corresponding to a print request from a host computer), a local copy print job (Local Copy: print processing of copy operation in which scanning and printing are performed by the same apparatus), a remote copy print job (Remote Copy: printing processing of copy operation in which scanning and printing are performed by different apparatuses through a network), a reception print job (Receive Print: printing an image received by a universal send function such as "FAX/IFAX"), and a report print job (Report Print: print processing to be performed when a printer or scanner operation log stored in the device is output in report form).

Obviously, display of a Web page like the one shown in FIGS. 11 or 12 can be realized by the procedure of the flow chart of FIG. 8 as in display of the Web page shown in FIGS. 9 or 10.

The print job status data displayed as in FIG. 10 and the print job log data displayed as in FIGS. 11 and 12 are stored in the HDD 2004 every time a print job is executed or accepted in the image processing apparatus 200. These data are updated every time the status changes. Note that since the storage data format is not specifically limited and obvious to those skilled in the art, a detailed description thereof will be omitted.

As described above, according to this embodiment, the Web server 1503 equivalent to a general server used on the Internet or the like to provide a home page is implemented on the image processing apparatus 200, and the HTTP protocol is used as a protocol between the image processing apparatus 200 and the host computer 11. This makes it possible to transmit log information of image output jobs received by the image processing apparatus as an HTML document from the image processing apparatus 200 to the host computer 11. Since this allows the user to browse a log of jobs with the Web browser on the host computer 11, the user can easily perform remote control in an operation environment similar to that for normal home page browsing without using any special application software. Since no special application software need be launched, the load on the host computer can be reduced. In addition, a system having high connection performance can be built owing to the high versatility of the HTTP protocol.

The user can check the jobs designated through the operation unit 2012, the jobs designated from the host computes 10 and 11 through the LAN 2011, the jobs received through the LAN 2011, and the jobs received through the WAN 2051 as a list.

In addition, since the status of jobs input to the image processing apparatus 200 are sorted and displayed in correspondence with the types of jobs, the user can easily check the status of desired jobs.

The first embodiment described above uses the Web server installed in the image processing apparatus including the scanner unit as an image input device, the printer unit as an image output device, the controller unit, and the user interface unit. However, by installing a Web server even in an image processing apparatus made up of a printer unit and controller unit, a remote user interface function can be implemented, and a print job log can be displayed. In this case, however, the print job type includes only PDL print.

[Second Embodiment]

In the first embodiment described above, a log of jobs is displayed by using the Web browser. In the second embodiment, a system in which an image processing apparatus having an image storage function is connected to a host computer 11 through a transmission medium such as a network is configured to allow the host computer 11 to acquire/display images stored in the image processing apparatus. Note that the hardware arrangements of the system and image processing apparatus according to the second embodiment are the same as those in the first embodiment.

In this embodiment, an area in an HDD 2004 in which image data are to be stored is divided into a plurality of areas in advance, which will be referred to as boxes. These boxes include a user box which is used to temporarily store the document scanned by a user and the PDL data sent from a Web client, and a system box which is used to store a received FAX document or the like. Numbers are assigned to the respective user boxes to identify them. Note that on a setting window (not shown), the user can set a box name and password for each user box and a time after which stored data can be automatically erased from a box. The user can also designate the operation of storing a scanned image or PDL data sent from a Web client in a box. In addition, a stored document can be transmitted by FAX or E-mail, moved to another box, or printed out in accordance with an instruction from the user.

Figure 13:
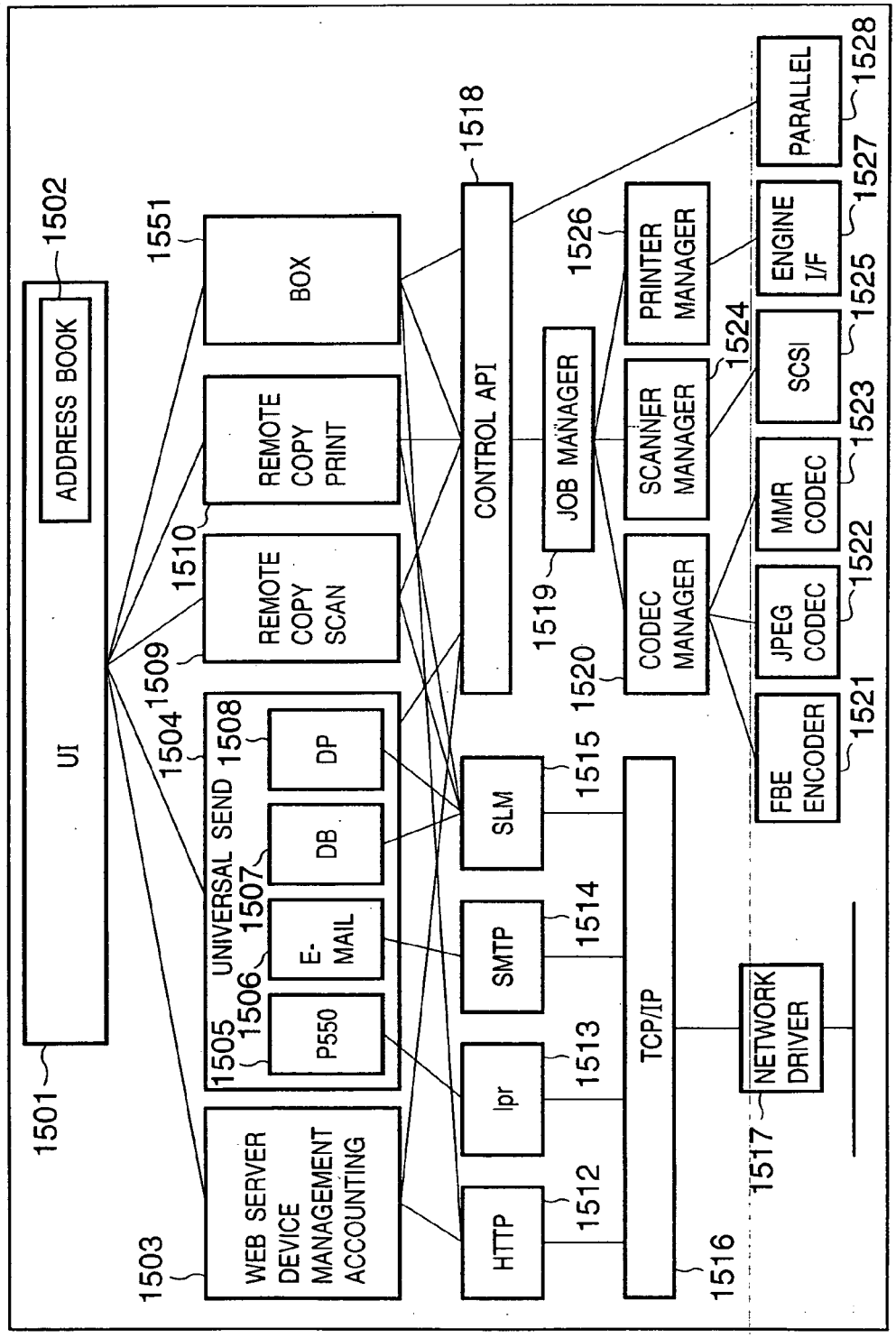

FIG. 13 is a block diagram showing the software arrangement of an image processing apparatus according to the second embodiment. The same reference numerals as in the first embodiment (FIG. 1) denote the same parts in FIG. 13. The arrangement in FIG. 13 differs from that in FIG. 2 in that it has a box module (Box) 1551. The box module 1551 provides a management function for storage of a scanned image or PDL print image in the HDD, printing of a stored image by a printer function, transmission by a universal send function, deletion of a document from the HDD, grouping (storing data in an individual box), movement of data between boxes, copying of data between boxes, and the like.

Note that a communication function is provided from the box module 1551 through an HTTP module 1512 and TCP/IP module 1516.

Referring to FIG. 13, the Web pull print module 1511 in the arrangement in FIG. 2 is replaced with the box module 1551. However, the box 1551 may be simply added to the arrangement in FIG. 2.

In the above arrangement, when a host computer 10 is connected to the local image processing apparatus by designating its URL (e.g., IP address) using a general browser, the top page of a remote UI as shown in FIG. 9 is displayed, as described in the first embodiment. Referring to FIG. 9, when a mail box button 105 is pressed (clicked), a box page as shown in FIG. 14 is displayed.

Figure 14:
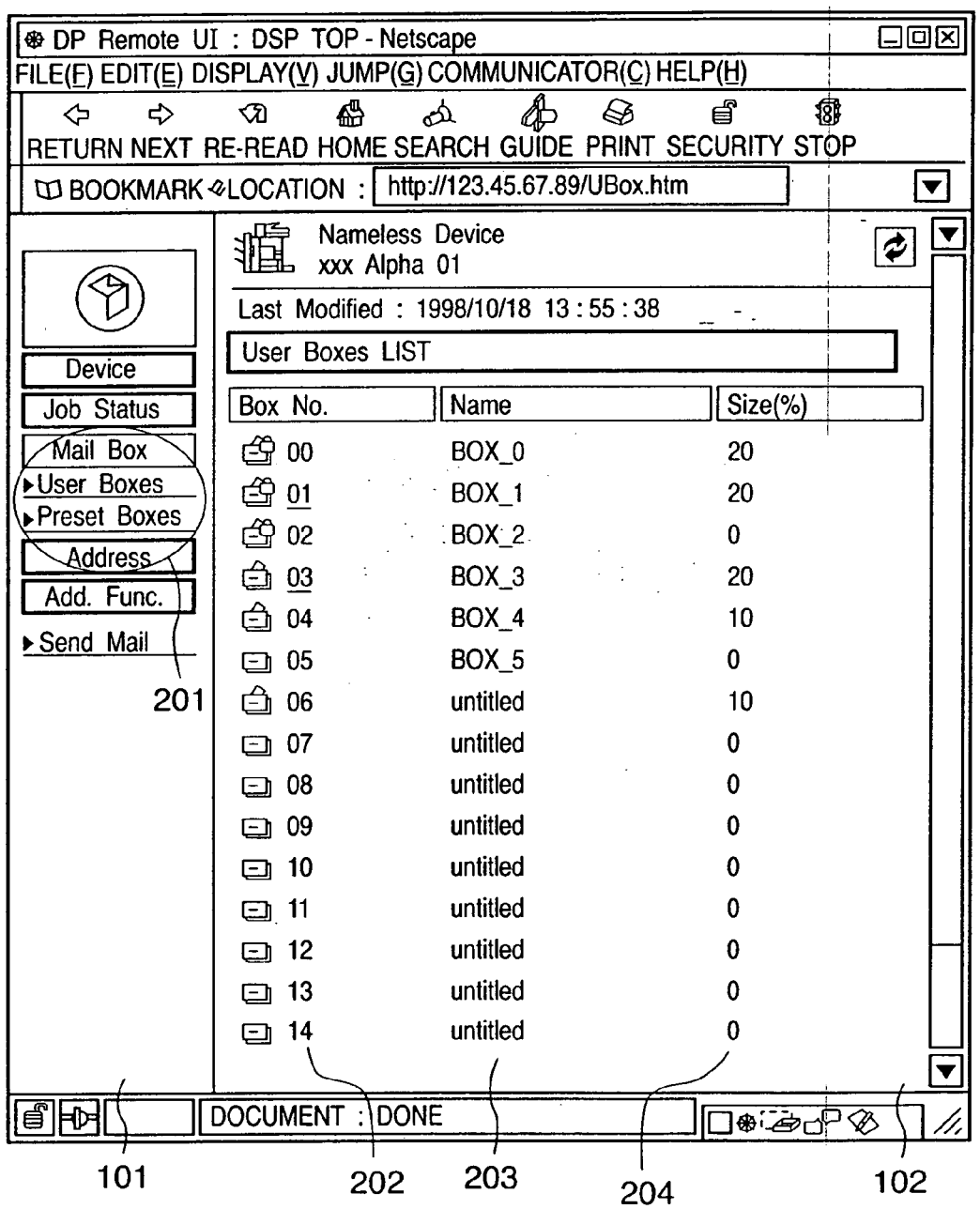

FIG. 14 is a view showing an example display of a box page in the second embodiment.

On the box page, a list of boxes that are currently present in the HDD 2004 of the image processing apparatus is displayed in a main area 102. The types of boxes to be displayed (user boxes (User Boxes) and system boxes (Preset Boxes)) can be selected through a submenu 201 displayed in an index area 101. A list of selected boxes is displayed in the main area 102. FIG. 14 shows a status where user boxes are selected. In the main area 102, a list of user boxes is displayed. For each user box, a box number 202, a box name 203, and a total box document image storage area occupation ratio 204 of document image data in the box are displayed as one record. Note that the total box document image storage area occupation ratio 204 is the ratio of the image data in the box to the HDD area allocated for the storage of box document image data. In addition, the box number 202 indicates link text, and a box content list display page is displayed when the user selects desired link text on the Web browser.

Figure 15:
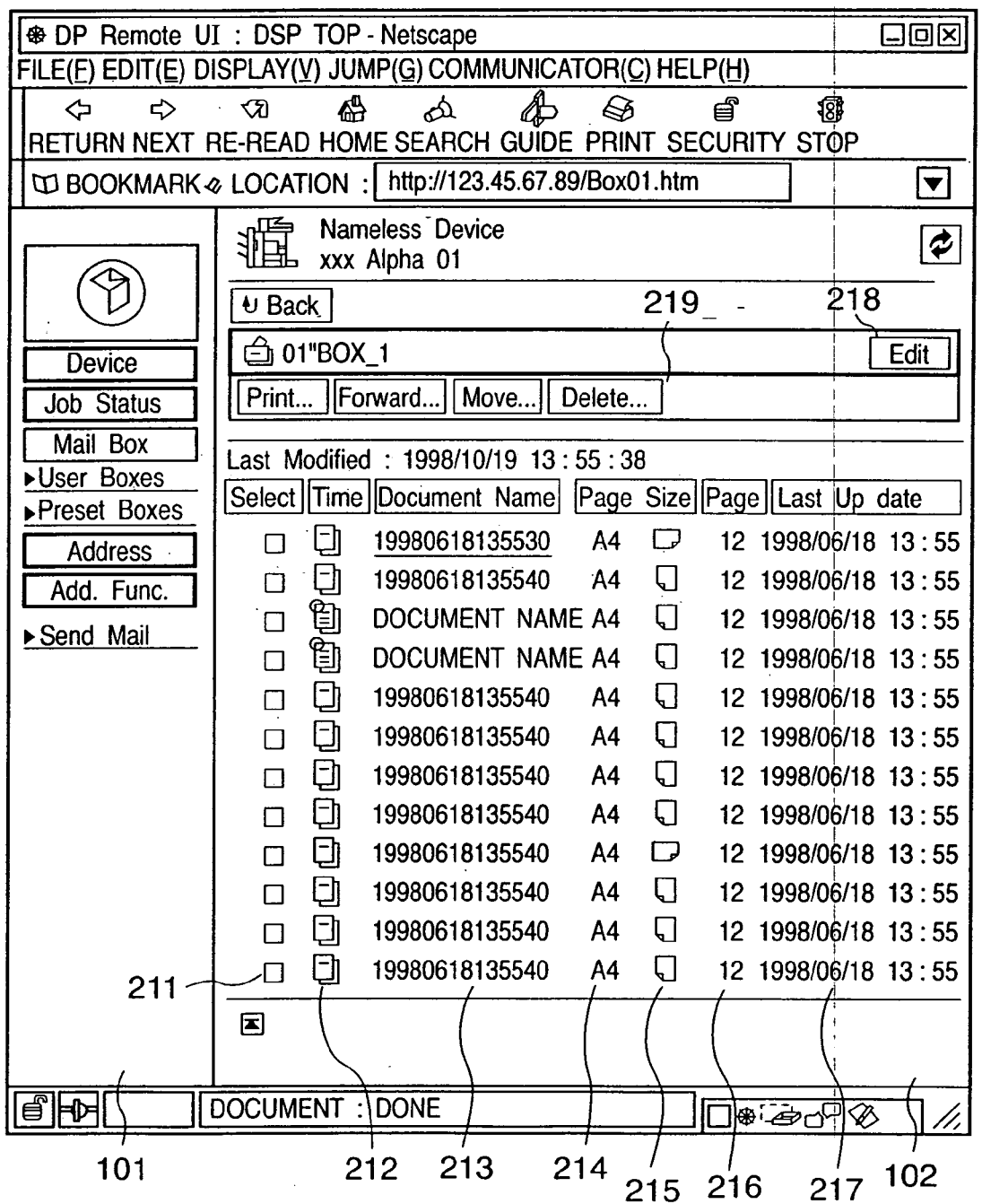

FIG. 15 is a view showing an example of box content list display page to be displayed when a box number link text is selected in the box page in FIG. 14.

Figure 19:
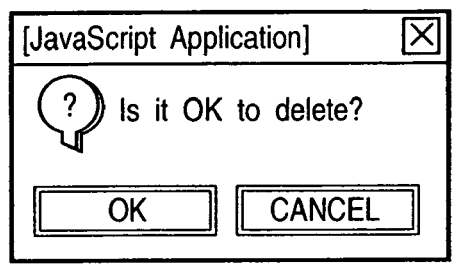

In the main area 102 of the box list display page, a list of box document images contained in the designated box is displayed. A selection check box 211, document image type 212, document image name 213, document image size 214, document image direction icon 215, document image page count 216, and last update date 217 are displayed as one record for each document image. In this case, the document image type 212 indicates whether the corresponding image data is "the image data obtained by the scanner" or "the image data stored upon bitmapping (without printing) of a received PDL print request". By checking a desired selection check box 211 and clicking one of designation buttons 219 (the Print button, Forward button, Move button, and Delete Button), the selected document can be processed as designated. If the Delete button is clicked, a confirmation window as shown in FIG. 19 is displayed. Referring to FIG. 19, if the OK button is clicked, the selected document is erased from the box. If the cancel button is clicked, the display in FIG. 15 is restored. The document image name 213 indicates link text. If this link text is selected on the Web browser, a box document image content display page is displayed.

If an edit button 218 is clicked, a window (not shown) is displayed, on which the user can set a box name and password for the corresponding box and a time after which a document can be automatically erased.

If the user tries to open a box for which a password is set on the window in FIG. 14, a password confirmation window (not shown) is displayed. If the correct password is input, the window switches to the box document display window in FIG. 15; otherwise, the contents of this box cannot be seen.

Figure 16:
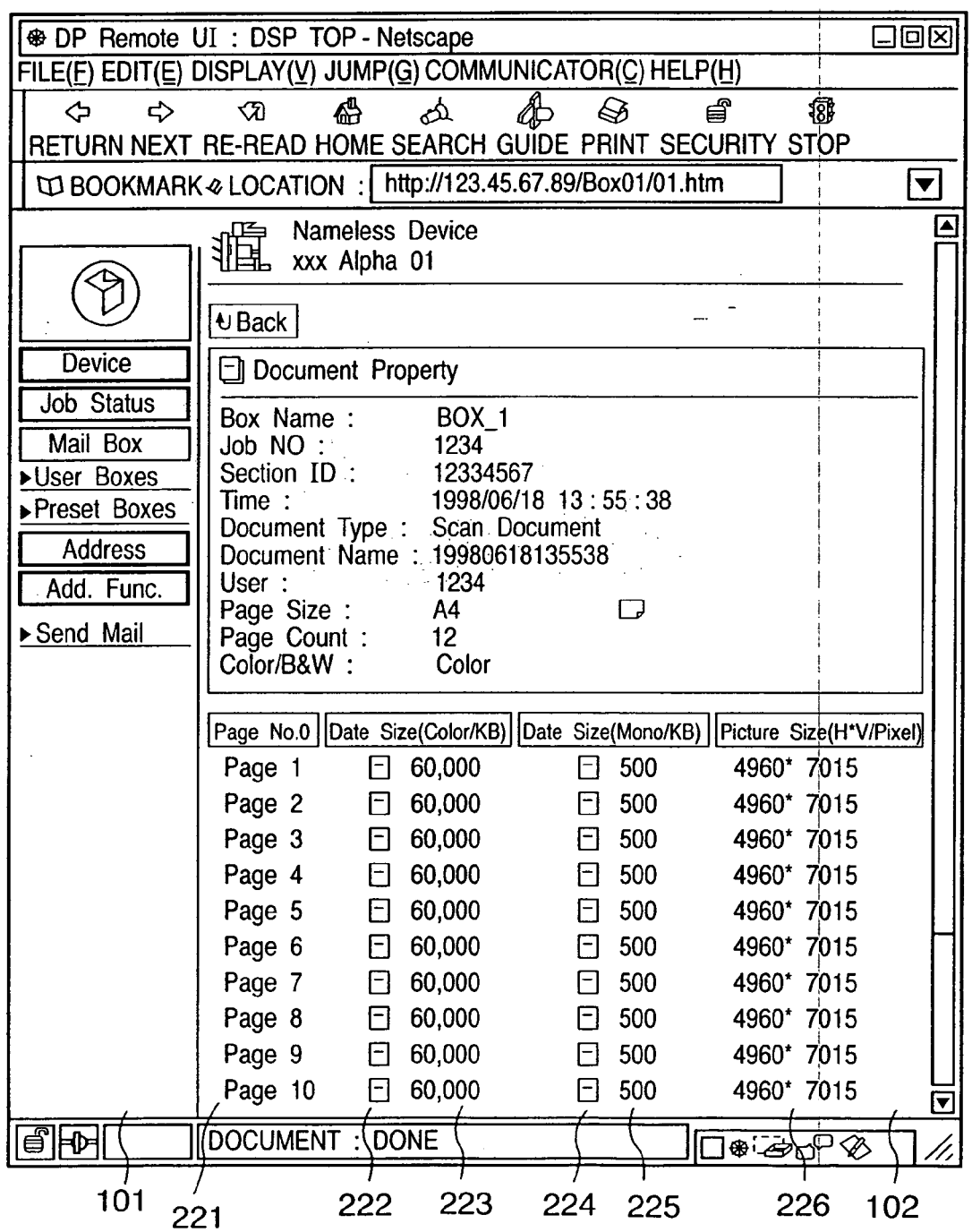

FIG. 16 is a view showing an example of a box document image content display page to be displayed when desired document image name link text is selected on the box content list display page in FIG. 15.

A list of contents of the respective pages of box document images is displayed in the main area 102 of the box document image content display page. A page number 221, color image icon 222, color image size 223, monochrome image icon 224, monochrome image size 225, and image pixel count (horizontal×vertical) 226 are displayed as one record for each page. In this case, there are both information about a color image and information about a monochrome image because each page holds both a color image and a monochrome image for the same image. Each image icon represents a link image. If one of these link images is selected on the Web browser, the corresponding image data stored in the image processing apparatus 200 is transferred to the Web browser on the host computer 10 by a Web server 1503, thus displaying the image. Note that a color image is transferred in the JPEG format, and hence is directly displayed in the Web browser. Since a monochrome image is transferred in the TIFF/MMR compression format, it is displayed by an image viewer application launched by the Web browser.

Figure 17:
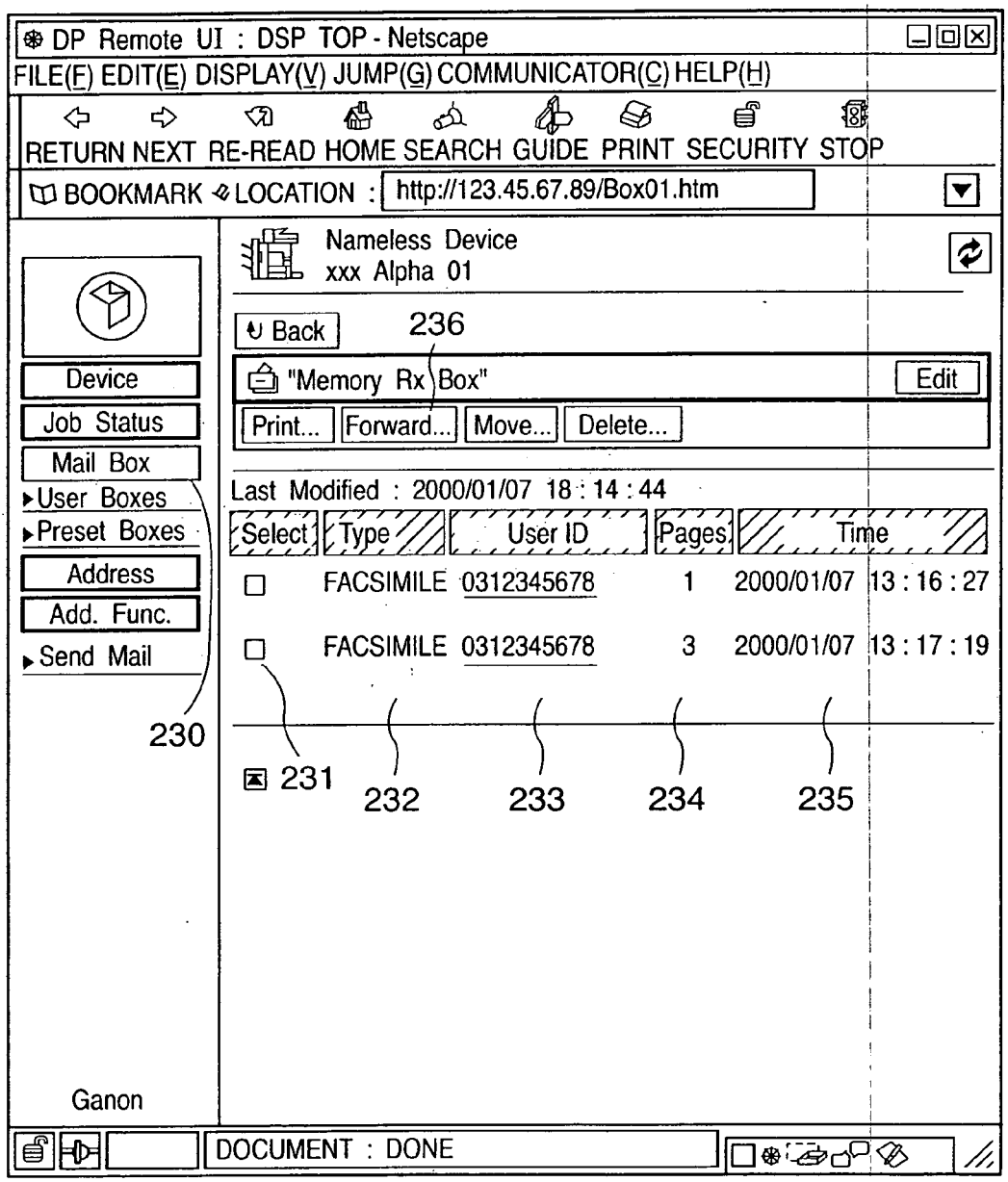

FIG. 17 is a view showing an example of the window to be displayed when "Preset Boxes" is selected. "Preset Boxes" includes "MEMORY RX BOX" for storing data received by FAX, IFAX, or the like, "MEMORY TX BOX" for transmitting data by FAX, IFAX, or the like, and the like. FIG. 17 shows an example display of "MEMORY RX BOX". In "MEMORY RX BOX", a selection check box 231, job type 232, source user name 233, document image page count 234, and reception date 235 are displayed. As in the user box described above, when a document is selected, detailed information about the document and information about each page are displayed. In addition, when a desired page is selected, the document contents are displayed.

The processing of transferring the above HTML file and image data from an image processing apparatus to the host computer 10 is implemented by the procedure described in the first embodiment (the flow chart of FIG. 8).

Figure 18:
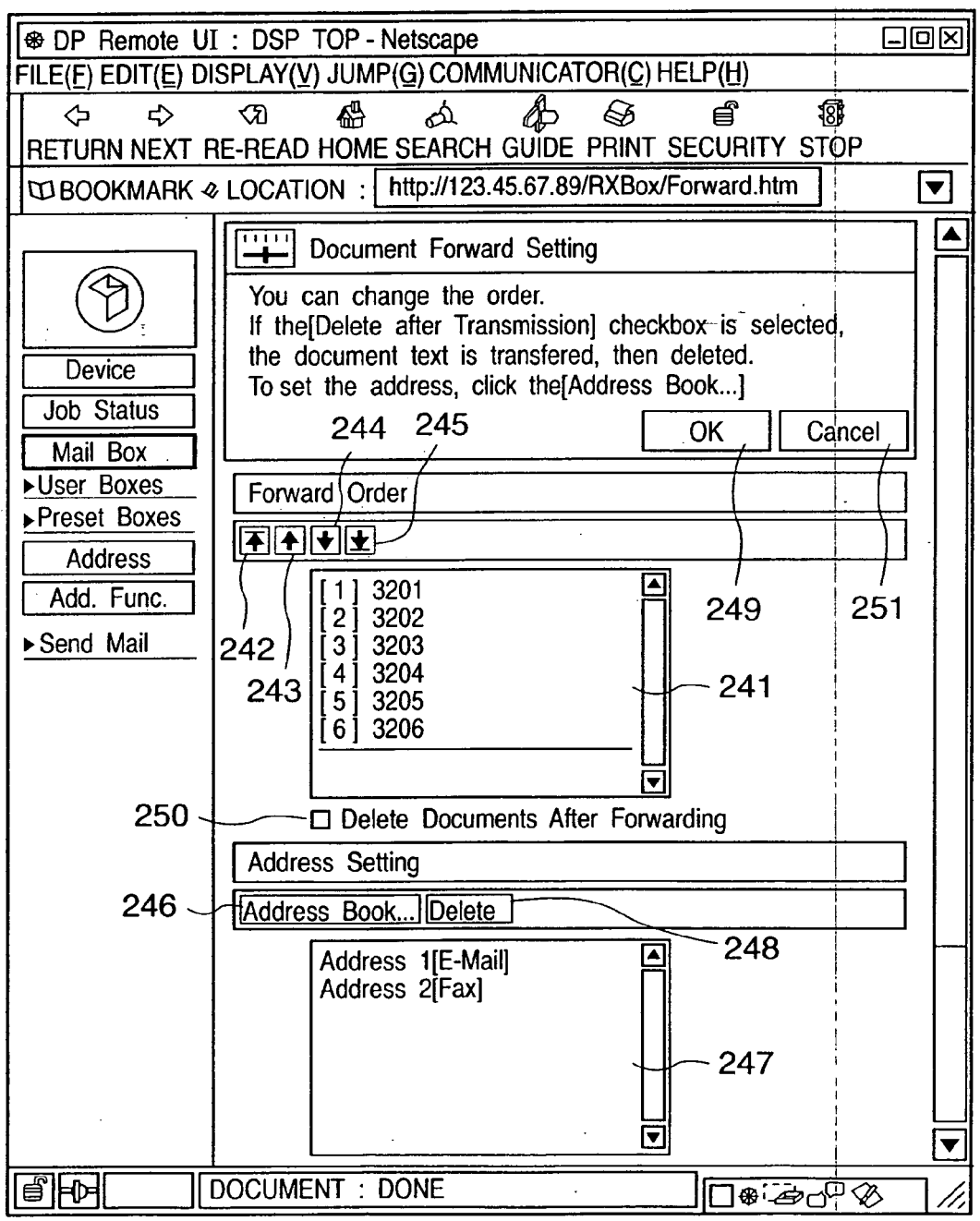

When documents stored in the box are selected and transferred, a forward button 236 is clicked in the case shown in FIG. 17 to display a setting window for document transfer as shown in FIG. 18.

In the display shown in FIG. 18, the selected documents are displayed in a selected document list column 241, and a transfer sequence can be designated by using buttons 242 to 245. Reference numeral 246 denotes a destination display button, which is clicked to display a destination display window (not shown). On the destination display window, registered addresses (FAX numbers, E-mail addresses, and the like) are displayed to allow the user to select transfer destinations. The destinations selected on the destination display window are displayed in a transfer destination list area 247. Reference numeral 248 denotes an erase button which is pressed to erase a selected transfer destination from the transfer destination list; and 249, an OK button which is pressed to execute transfer.

Reference numeral 250 denotes a document erasure check column which allows the user to choose between erasing data after it is printed out or not erasing it. If this column is checked, the corresponding data is erased when it is normally transferred. Reference numeral 251 denotes a cancel button which is pressed to return to the box document display window (FIG. 17) without performing transfer.

The flow of processing for the transfer of documents in a box on the host computer 10 side will be described below with reference to the flow chart of FIG. 8. The processing from input operation in step S101 for invoking the window in FIG. 18 to display operation in step S104 is performed. A box password is input again in step S101 (if a password is set for the designated box), and various input operations, e.g., selecting a document in the box and selecting a transmission destination. Information sent from an image processing apparatus 200 in response to the inputs is then displayed. In this manner, the processing in steps S101 to S104 is repeated as needed. In determining an input in step S101, the host computer determines whether the parameter input by the user raises a problem. If a problem is posed, no command is transmitted in step S102.

Figure 20:
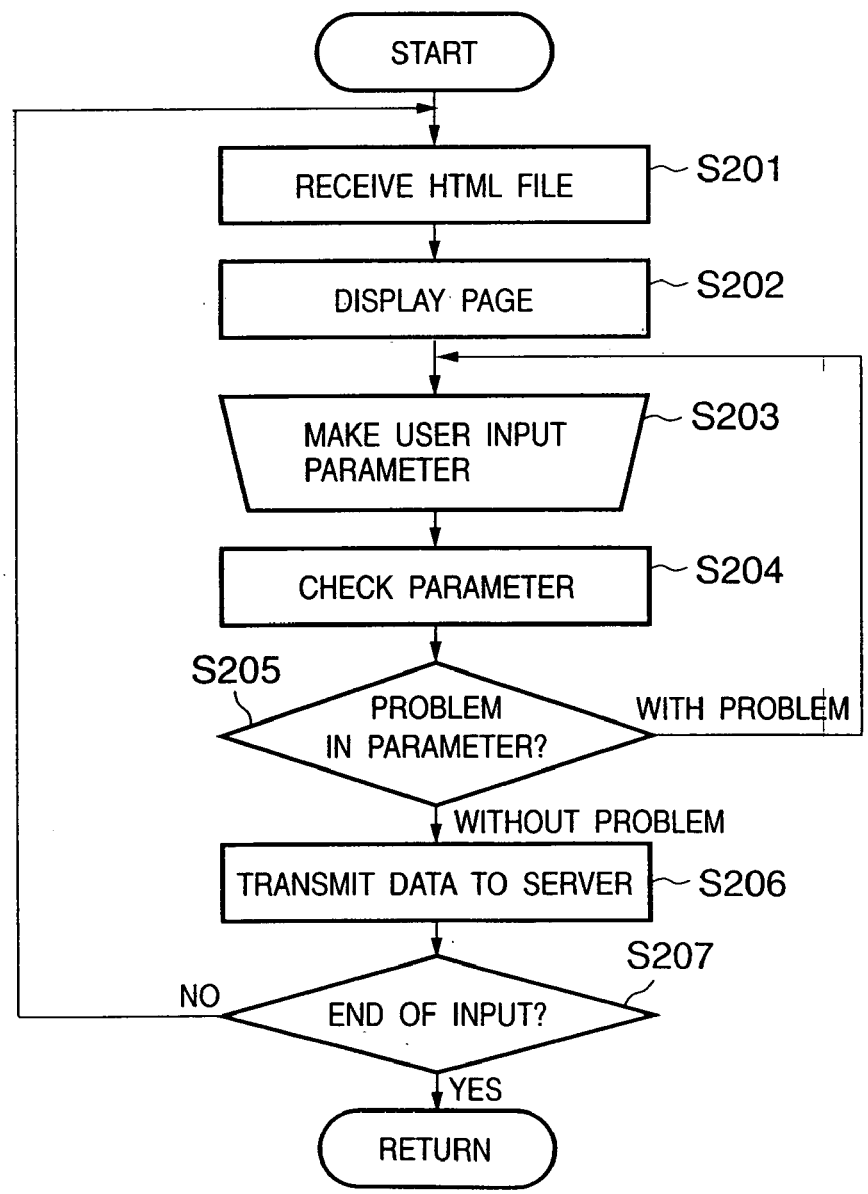
FIG. 20 is a flow chart showing the flow of processing on the host computer side in executing remote UI.

The detailed flow of processing after the display of the setting window for this document transfer is indicated by the flow chart of FIG. 20. More specifically, after the window in FIG. 18 is invoked, the processing in steps S201 to S206 is repeated until the end of input operation in step S207. In this case, the decision in step S206 is made on the basis of the script code contained in an HTML file sent from a Web server. If, for example, characters other than numerals are input in a column in which numerals should be input, the user is prompted to return to step S203 to input data again.

Figure 21:
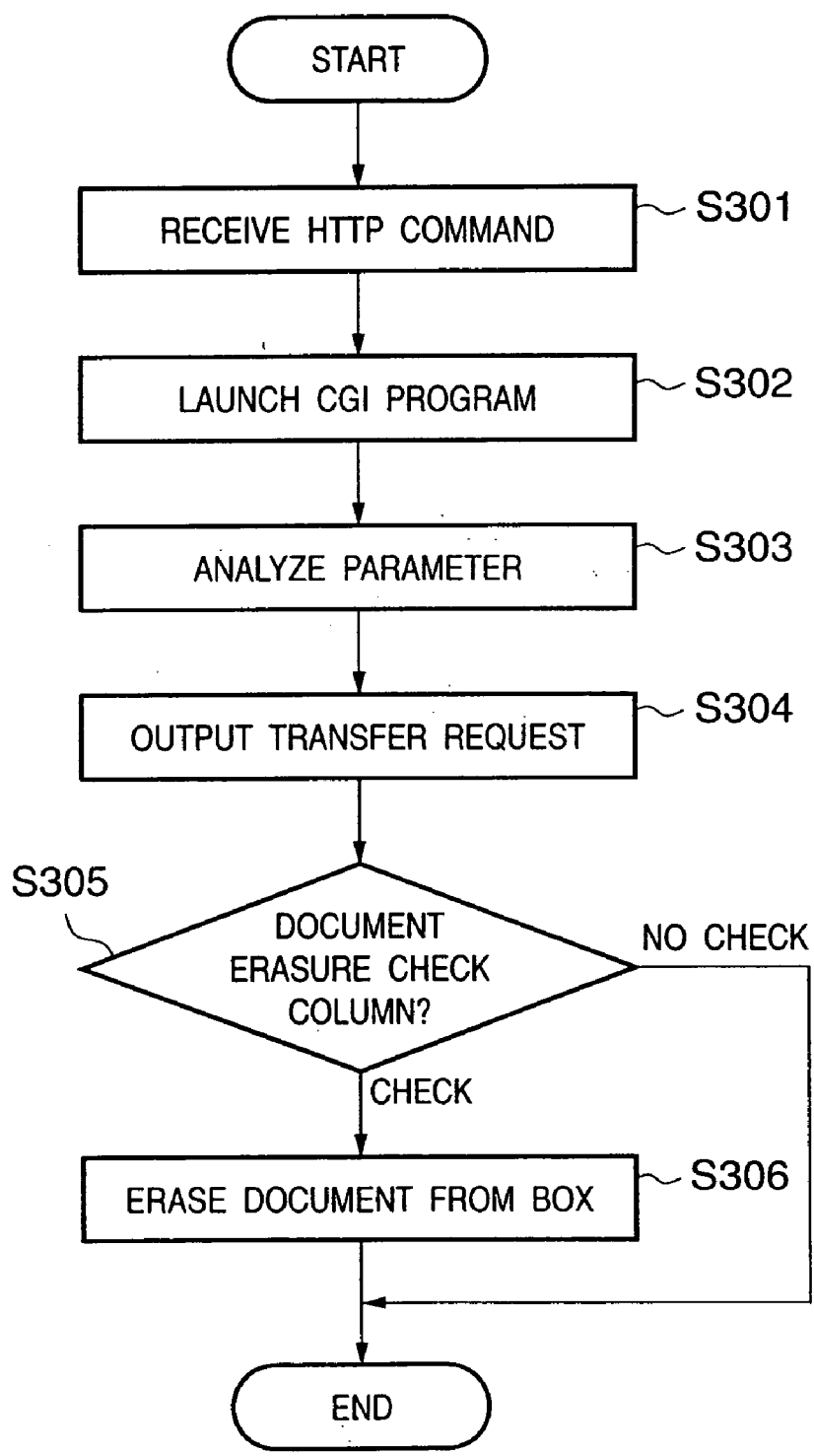
FIGS. 21, 23, and 29 to 32 are flow charts showing the flows of processing on the image processing apparatus side in executing remote UI.

The details of processing on the Web server side will be described with reference to the flow chart of FIG. 21.

Upon reception of final transfer settings (e.g., a specified document to be transferred and destination information) in step S301 after user authentication using a password, presentation of a document list, confirmation of selection, and the like, which are done by exchanging information a plurality of number of times as shown in FIG. 20, the CPU launches a CGI program for document transfer in step S302. In step S303, the CPU analyzes parameters such as the document information and destination information received in step S301. In step S304, the CPU gives a transfer processing request to a Network 2010 or MODEM 2050 to execute transfer processing in accordance with the destination designated in step S304.

If the transfer processing is normally performed, the CPU checks in step S305 whether the document erasure check column 250 is checked. If NO in step S305, the processing is terminate immediately. If YES in step S305, the CPU erases the corresponding document from the box and terminates the processing.

A case where documents stored in the box are selected to be printed by a printer 2095 will be described next.

Figure 22:
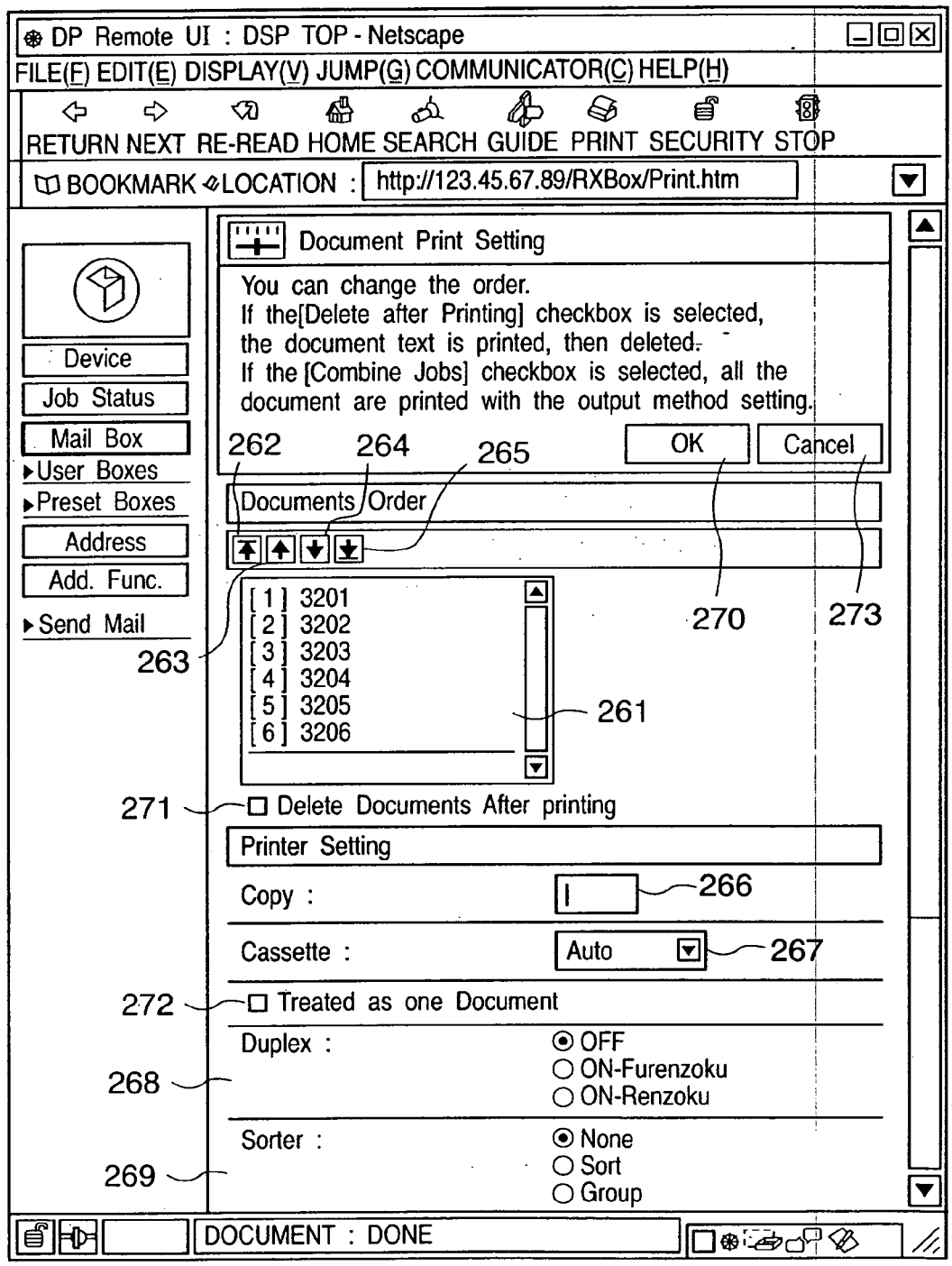

When the Print button on the window in, for example, FIGS. 15 or 17 is clicked, the current window switches to the print setting window in FIG. 22.

As shown in FIG. 22, selected documents are displayed in a selected document list column 261, and a printing sequence can be designated by buttons 262 to 265. When the user designates a print count in a print count designation column 266, a paper cassette in a 267, information about double-sided printing in a double-sided printing designation column 268, and information about sorting in a sorting designation column 269, and clicks an OK button 270, he/she can output a print instruction.

Reference numeral 271 denotes a document erasure check column which allows the user to choose between erasing data after it is printed out or not erasing it. If this column is checked, data is erased after it is transferred. Reference numeral 272 denotes a document merge check column, which is used to print out a plurality of documents as one job; and 273, a cancel button which is pressed to return to a window (box document display window) immediately preceding the current window without performing printout.

The processing to be performed by the Web browser when a request to print out data in a box is generated from the Web browser of a Web client by using the remote UI function of the image processing apparatus according to this embodiment will be described next.

The flow of processing will be described with reference to the flow chart of FIG. 20.

In step S201, the Web browser receives an HTML file sent from the Web server 1503 of the image processing apparatus 200. In step S202, the received file is displayed on a window. The window displayed in this case is the print window shown in FIG. 22. In step S203, the user inputs a necessary parameter, e.g., a print count in the print count designation column 266, to the browser, and presses the OK button 270.

In step S204, the CPU checks whether the parameters set by the user are appropriate. This check is made on the basis of a script code contained in the file sent from the Web server 1503. If inappropriate input is done, e.g., characters other than numerals are input in a column in which a print count should be set, ("with problem" in FIG. 205), the flow returns to step S203 to prompt the user to input again. If no problem arises in this check ("without problem" in step S205), the CPU transmits an HTTP command to the Web server 1503 to request it to print out the data (step S206).

The processing to be performed by the Web server 1503 when a request to print out data in a box is output from the Web browser will be described next.

Figure 23:
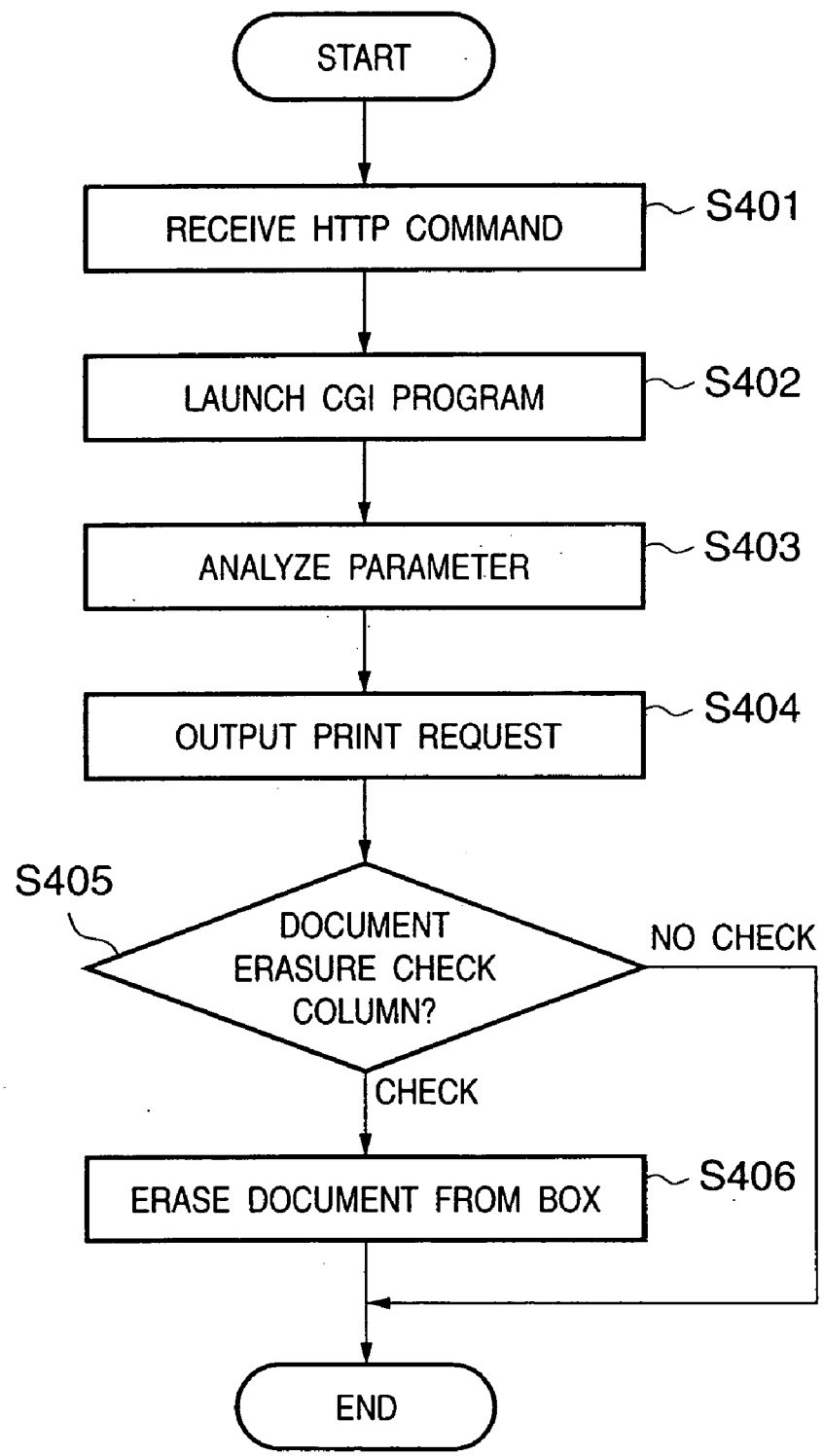

FIG. 23 is a flow chart showing the processing to be performed by the Web server 1503 upon reception of a printout request from the Web browser.

In step S401, the Web server 1503 receives an HTTP command from the Web browser of a Web client through the network connection unit 2010. In step S402, the Web server 1503 launches a CGI program corresponding to the printout request.

In step S403, the launched CGI program analyzes the parameters sent from the browser, e.g., the print count, print paper type, and sorting method. In step S404, the parameters are set, and a print request is output to the printer 2095 to execute printing. In step S405, it is checked whether the document erasure check column 271 in FIG. 22 is checked. If YES in step S405, the flow is immediately terminated. If NO in step S405, the flow advances to step S406 to erase the data from the box in the HDD 2004 after it is printed out.

Figure 24:
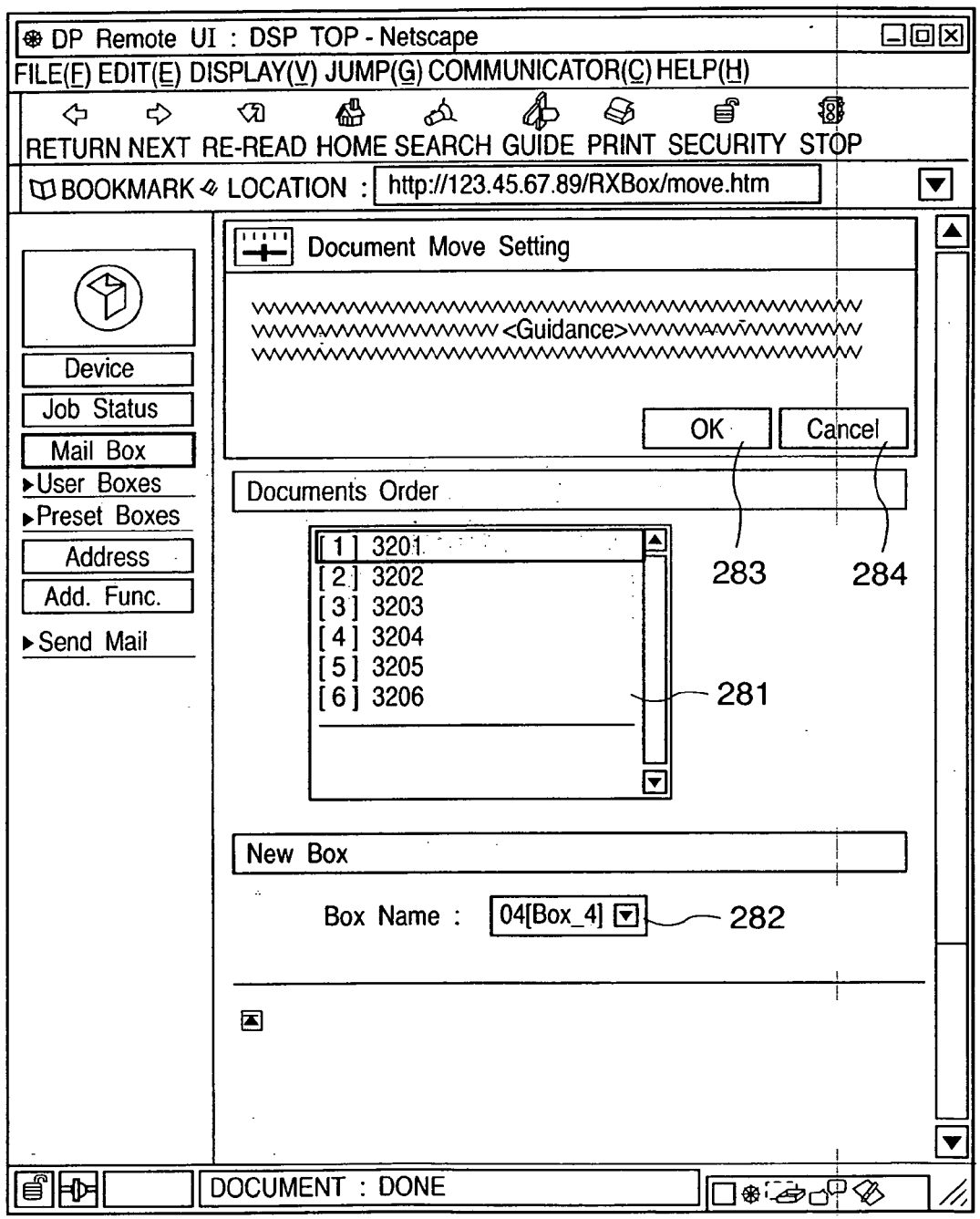

If the Delete button on, for example, the window in FIGS. 15 or 17 is clicked, the current window switches to a box movement window as shown in FIG. 24.

As shown in FIG. 24, selected documents are displayed in a selected document list column 281. When the user selects a movement destination box in a movement destination box selection column 282 and presses an OK button 283, the selected documents are moved. Reference numeral 284 denotes a cancel button, which is pressed to return to a window (box document display window) immediately preceding the current window without moving any documents.

In this case, processing is performed on the browser side in the same flow as that described above.

The processing on the Web browser side is the same as that described above except that "transfer processing" and "print processing" are replaced with "movement processing", and processing associated with document erase operation is omitted. That is, parameters about information on designated documents and a movement destination box are analyzed, and the storage destination box is changed in accordance with the analysis result.

The above operation by the remote UI can also be performed from an operation unit 2012 in the same manner as described above.

As described above, according to the second embodiment, the Web server 1503 is implemented on the image processing apparatus 200, and the HTTP protocol is used as a protocol between the image processing apparatus and the host computer, thereby allowing the image information stored in the image processing apparatus to be transmitted as an HTML document from the image processing apparatus. In addition, since an image stored in the image processing apparatus can be transmitted as an image file from the image processing apparatus to the host computer, and the user can browse and operate this file through the Web browser on the host computer, the user can easily perform remote control. In addition, a system having high connection performance can be built owing to the high versatility of the HTTP protocol. Note that HTTP is used as a transfer protocol for transmission of an image stored in the image processing apparatus as an image file from the image processing apparatus to the host computer. In this case, a mime type such as image/TIFF or image/jpeg is added as a response header depending on the type of image.

According to this embodiment, since the user can generate a request to print out image data stored in a box in an image processing apparatus from the Web browser of a client on a network, the user can easily print out the image data in the box as in operation from the operation unit 2012 without going to the image processing apparatus.

Since the user can generate a request to transfer image data stored in a box in an image processing apparatus by FAX or E-mail from the Web browser of a client on a network, the user can easily transfer the image data in the box without going to the image processing apparatus.

In addition, in printing or transferring the image data in the box, the user can easily set necessary parameters on the Web browser.

Furthermore, by transmitting a setting file for setting parameters from the server of an image processing apparatus to the Web browser of a client, any special driver or the like need not be installed in the client, and a general Web browser can be used.

Moreover, a setting file is used to check on the browser whether any inappropriate input is made, e.g., characters other than numerals are input as a print count. If an inappropriate setting is made, the user is prompted again to input data. This eliminates the necessity to make this check on the server side, thus reducing the load on the server and network.

The above embodiment uses the Web server installed in the image processing apparatus including the scanner unit as an image input device, the printer unit as an image output device, the controller unit, and the user interface unit. However, by installing a Web server even in an image processing apparatus formed by a controller unit having an image storage function, a remote user interface function can be implemented, and an image can be displayed.

[Third Embodiment]

The first embodiment has exemplified the arrangement for displaying print job status and a print job log by using the Web browser. The third embodiment will exemplify an arrangement for allowing the status of print jobs to be changed. According to the third embodiment, in a system in which an image processing apparatus is connected to a host computer through a transmission medium such as a network, the status information of a plurality of jobs reserved to be output in the image processing apparatus is acquired/displayed by the host computer. Note that the hardware arrangements of the system and image processing apparatus according to the third embodiment are the same as in the first embodiment.

Figure 25:
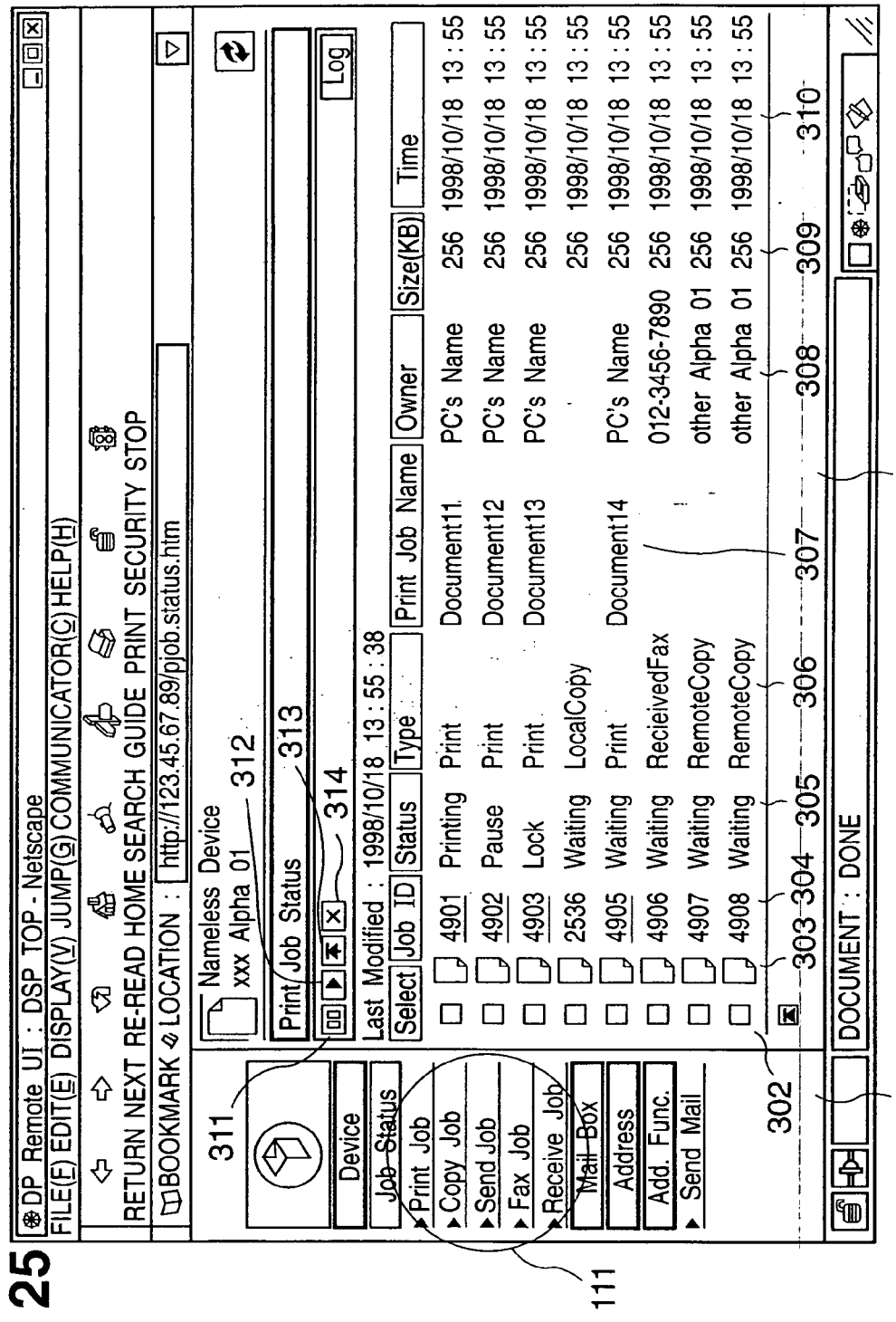

FIG. 25 is a view showing an example of the job status page to be displayed after the job status button is pressed on the top page shown in FIGS. 25 or 9. Although the display contents in FIG. 25 are the same as those in FIG. 10, reference numerals are added which are required to explain the third embodiment.

As shown in FIG. 25, a list of job status currently input to an image processing apparatus 200 is displayed on a job status page. The user can select a type of job to be displayed ("Print Job", "Copy Job", "Send Job", "Fax Job", and "Receive Job") from a submenu 111 displayed in an index area 101, and a list of job status corresponding to a selected job type is displayed in a main area 102. FIG. 25 shows a display status where "Print Job" is selected. A list of print job status is displayed in the main area 102. A job status icon 303, job number 304, job status 305, job type 306, job name 307, job owner 308, job size 309, and job reception time 310 are displayed as one record for each print job.

The job status include "Printing" (during printing: a print job that is currently executed), "Waiting" (waiting for printing: a job in a print queue, which is executed when its turn comes), "Pause" (during a pause: a job in a print queue, which is skipped without being executed even if its turn comes), and "Lock" (a lock status: a job in a print queue, which is locked by a password and is not executed until it is selected and the password is input). The job types include "Print" (PDL print), "Local Copy" (local copy print), "Remote Copy" (remote copy print), "Received" (receive print), and "Report" (report print). Jobs in a print wait status are sequentially aligned and displayed in descending order. A selection button 302 is set on the left end of each record to allow selection of the job in the corresponding record. A tool bar is displayed, which includes a job pause button 311 (for changing a selected job from the "Waiting" status to the "Pause" status), a job resume button 312 (for changing a selected print job from "Pause" status to the "Waiting" status), a job promote button 313 (for moving a selected print job to the head of a print queue (next to the print job that is currently executed)), and a job cancel button 314 (for deleting a selected print job). By using these buttons, the user can change the status of the print job selected by the selection button 302.

Each job number 304 indicates link text. By selecting this, the detailed information page of the corresponding job is displayed.

Figure 26:
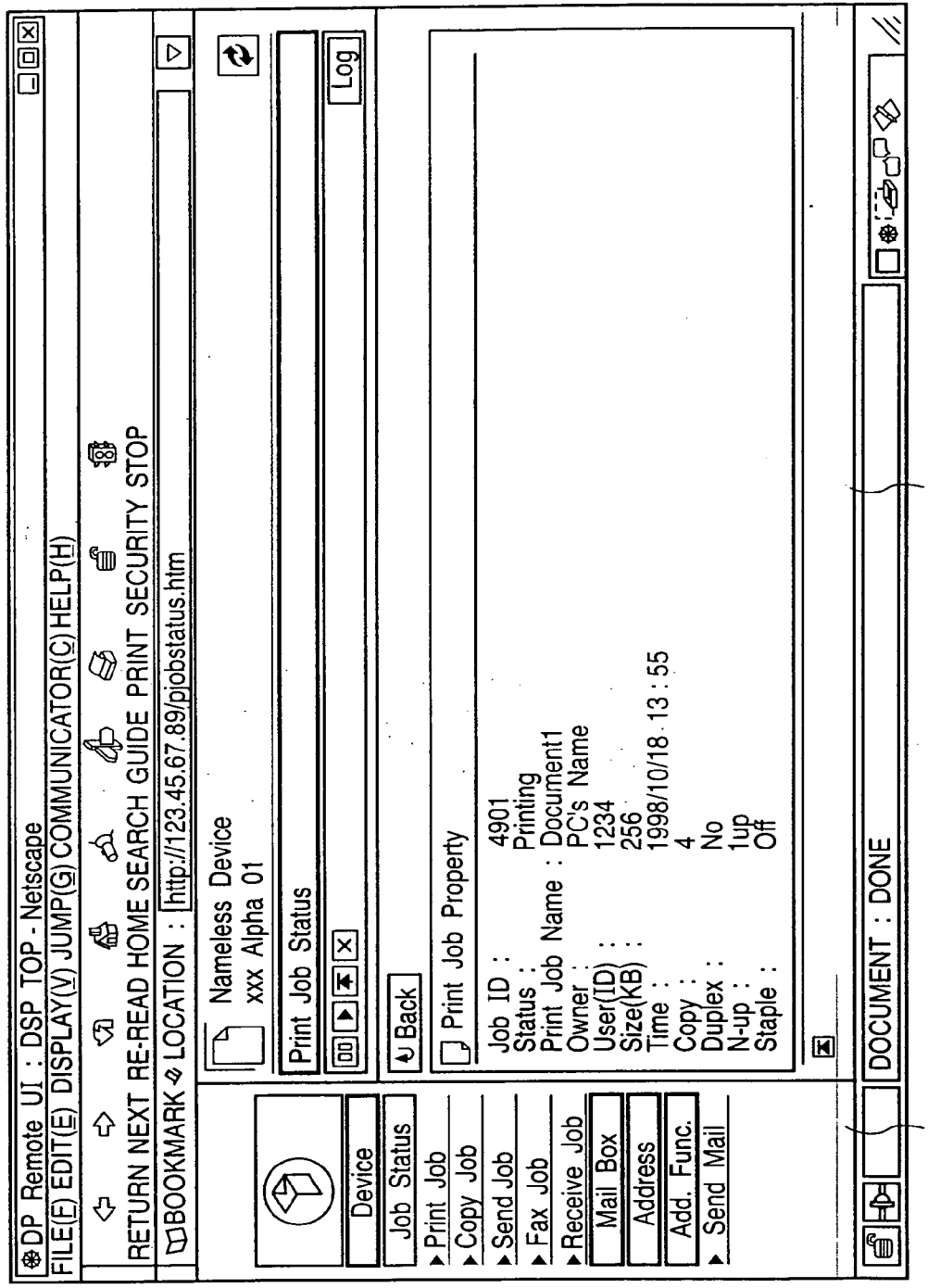

FIG. 26 is a view showing an example display of the detailed information page of a print job. In the main area 102, the detailed information such as the reception date, reception number, job status, department ID, job name, job owner, page count, and copy count is displayed.

Figure 27:
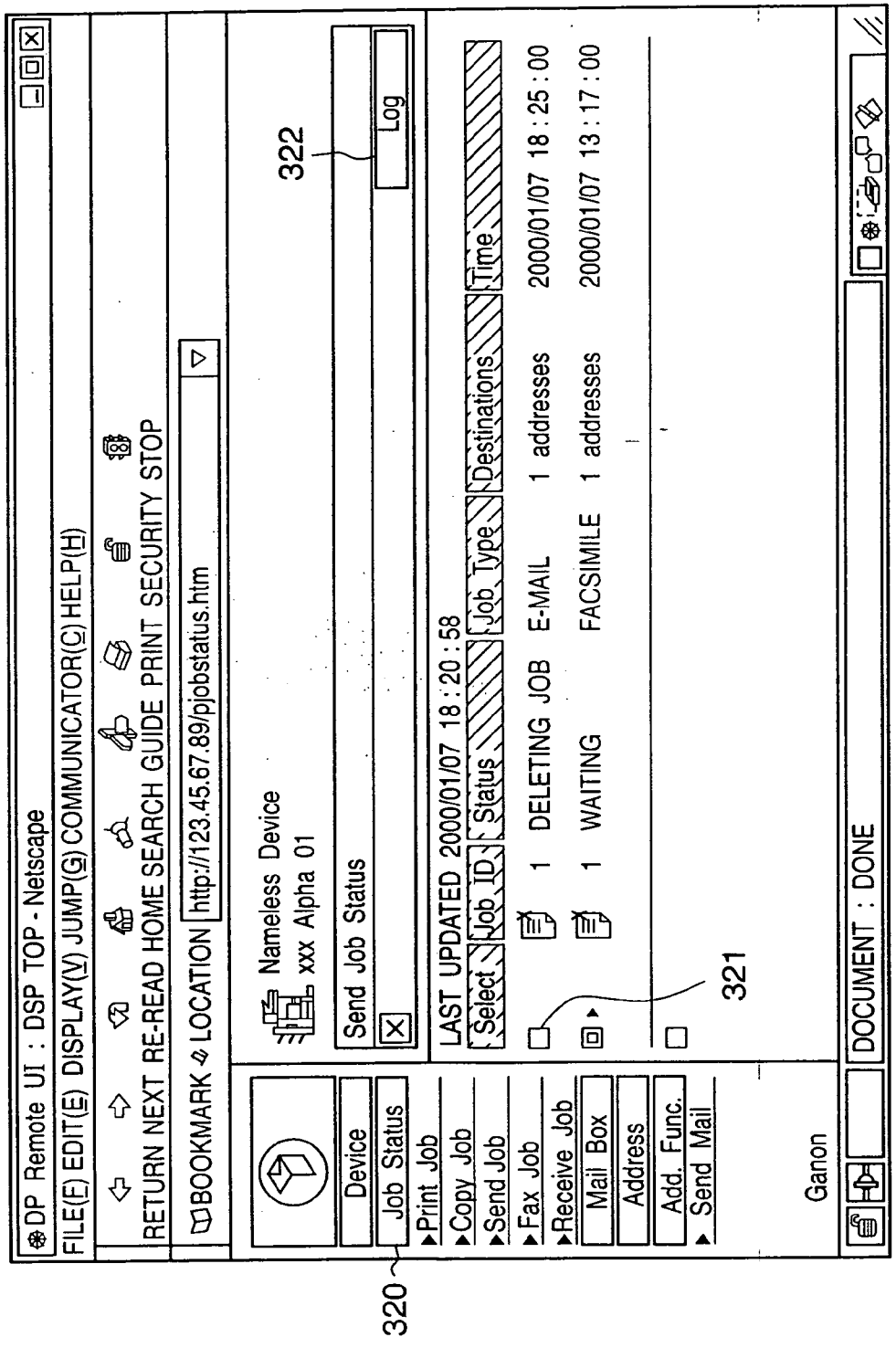

FIG. 27 is a view showing an example of the "Send Job Status" page to be displayed after the Send Job Status button in "Job Status" is pressed.

A list of jobs having data to be sent and remaining in the image processing apparatus 200 is displayed. This list includes, from the left, a selection check box for designating a process, job status icon, "Job ID" for specifying a job, "Status" indicting the status of a job, "Job Type" indicating the type of job, "Destinations" indicating the number of destinations designated, and "Time" indicating the date at which a job was received.

In designating a desired document and making a setting change or the like, the user checks a check box 321 and invokes a setting window.

Figure 28:
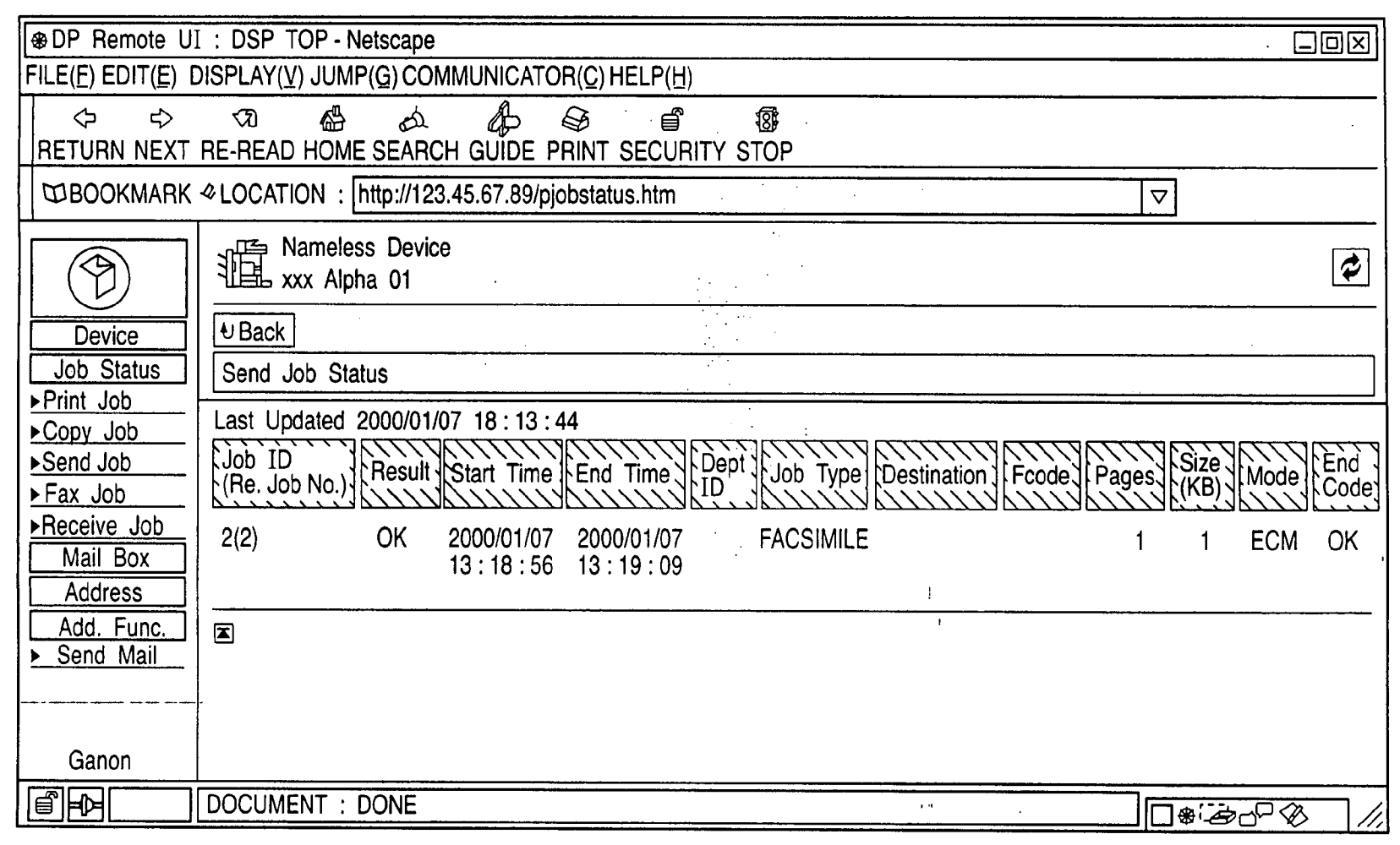

When a Log button 322 is clicked, a list of logs of send jobs that have already been executed in the image processing apparatus 200 is displayed as shown in FIG. 28. This list includes, from the left, "Job ID(Re.Job No.)" for specifying a job, "Result" indicating the execution result on the job, "Start Time" indicating the time at which the job was started, "End Time" indicating the time at which the job was completed, "Det.ID" indicating a department that is designated for department-specific management, "Job Type" indicating the type of job, "Destination" indicating a transmission destination, "F code" indicating an F code that was designated and transmitted, "Pages" indicating the number of pages transmitted, and "End code" indicating the type of error if the processing is terminated with an error. The data in this log can be retransmitted upon a destination change or the like.

The flow of processing in executing a job upon changing the contents on the above window will be described below.

Figure 29:
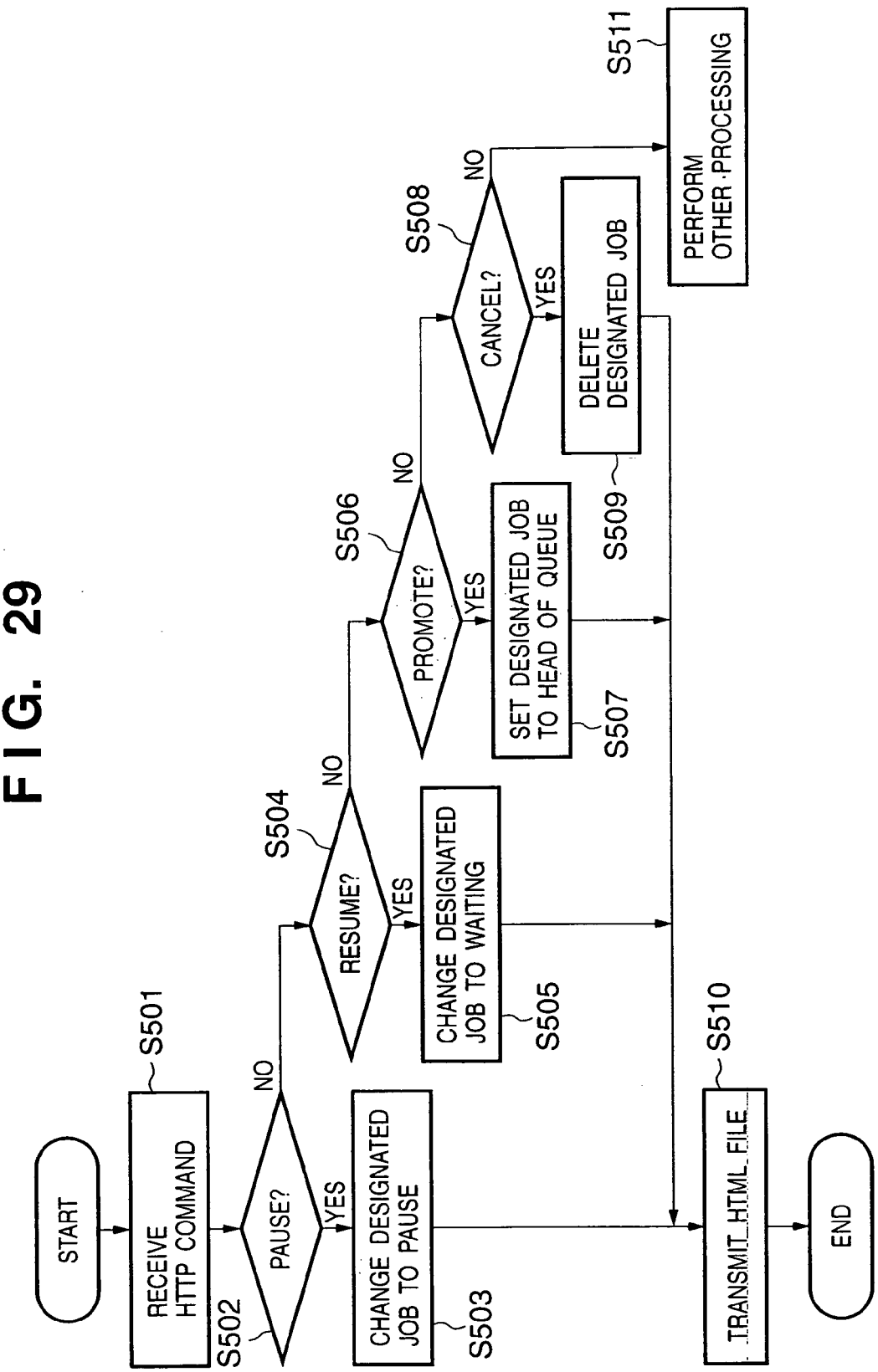

FIG. 29 is a flow chart showing the flow of processing on the Web server 1503 side in changing the contents of a print job on the window shown in FIG. 25.

First of all, for example, the user displays the window in FIG. 26 by using the Web browser, selects a desired print job on the window in FIG. 25, and generates an instruction to perform desired processing. The Web server 1503 receives an HTTP command indicting the content of this instruction in step S510.

If it is determined in step S502 that the content of this instruction indicates "Pause", the job designated in step S503 is changed to "Pause", and the corresponding information is reflected in an HTML file. Likewise, the instruction content is determined in steps S504, S506, and S508, and the status of the job is changed in steps S505, S507, and S509 in accordance with this determination result. The corresponding information is then reflected in the HTML file.

In step S510, this changed HTML file is transmitted to the host computer 10 to reflect this change in the display on the Web browser.

If the instruction coincides none of the above instructions, other processing is executed in step S511.

Figure 30:
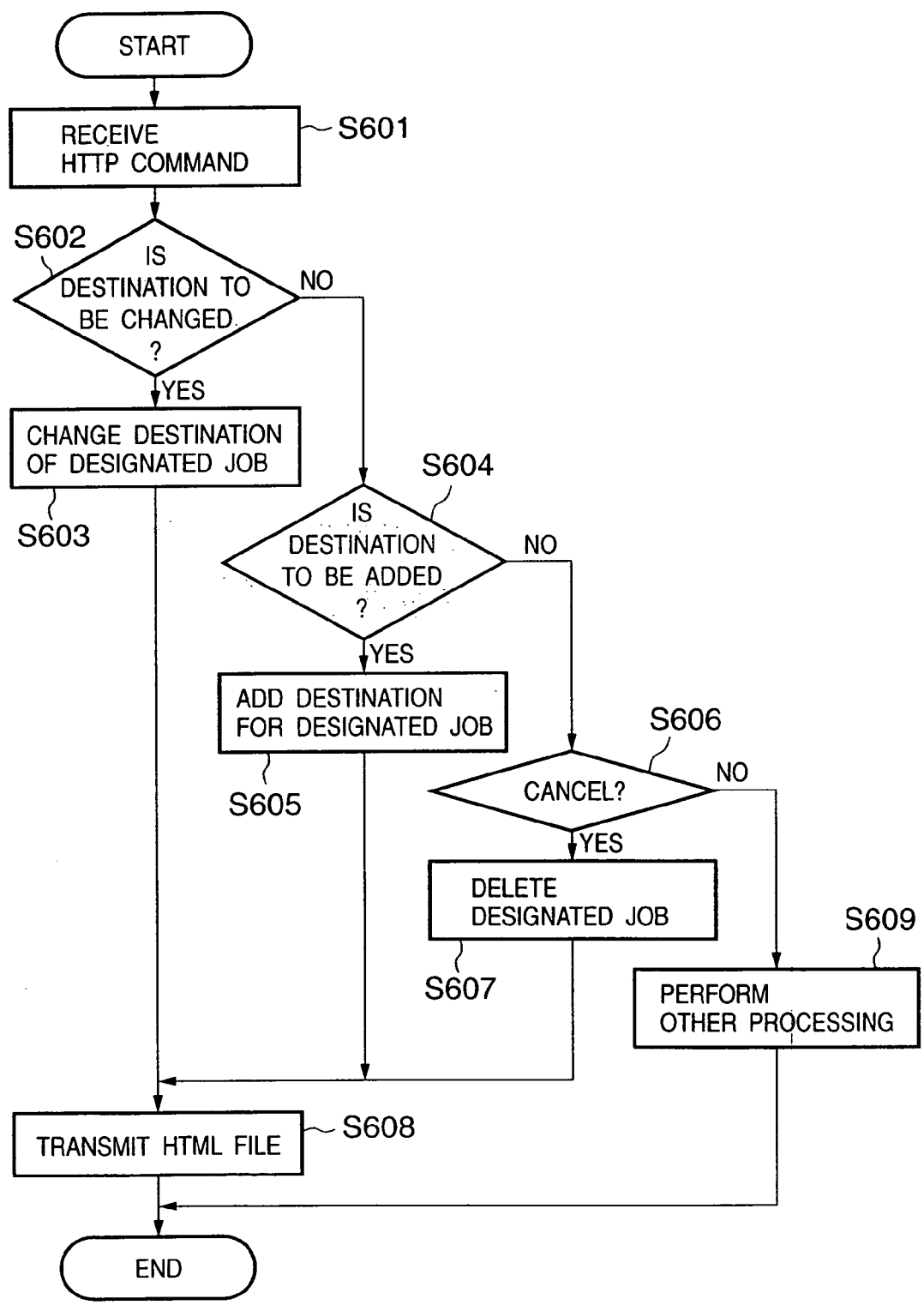

FIG. 30 is a flow chart showing the flow of processing on the Web server side in changing or adding a destination with respect to a transmission job that has already been input.

First of all, the user designates a desired job on the window in FIG. 27 by using the Web browser of the host computer 10. When a destination is to be changed or added, the user selects a destination as in the case of transfer processing described above. When the job is to be canceled, the user generates a corresponding instruction. The Web server 1503 receives an HTTP command indicating this instruction content in step S601.

If it is determined in step S602 that the instruction content indicates a destination change, the destination of the designated job is changed in step S603, and the corresponding information is reflected in the HTML file. Likewise, the instruction content is determined in steps S604 and S606, and the contents of the job are changed in steps S605 and S607 in accordance with this determination result. The corresponding information is reflected in the HTML file.

In step S608, the changed HTML file is transmitted to the host computer 10, and this change is reflected in the display on the Web browser.

If the instruction coincides with none of the above instructions, other processing is executed in step S609.

Figure 31:
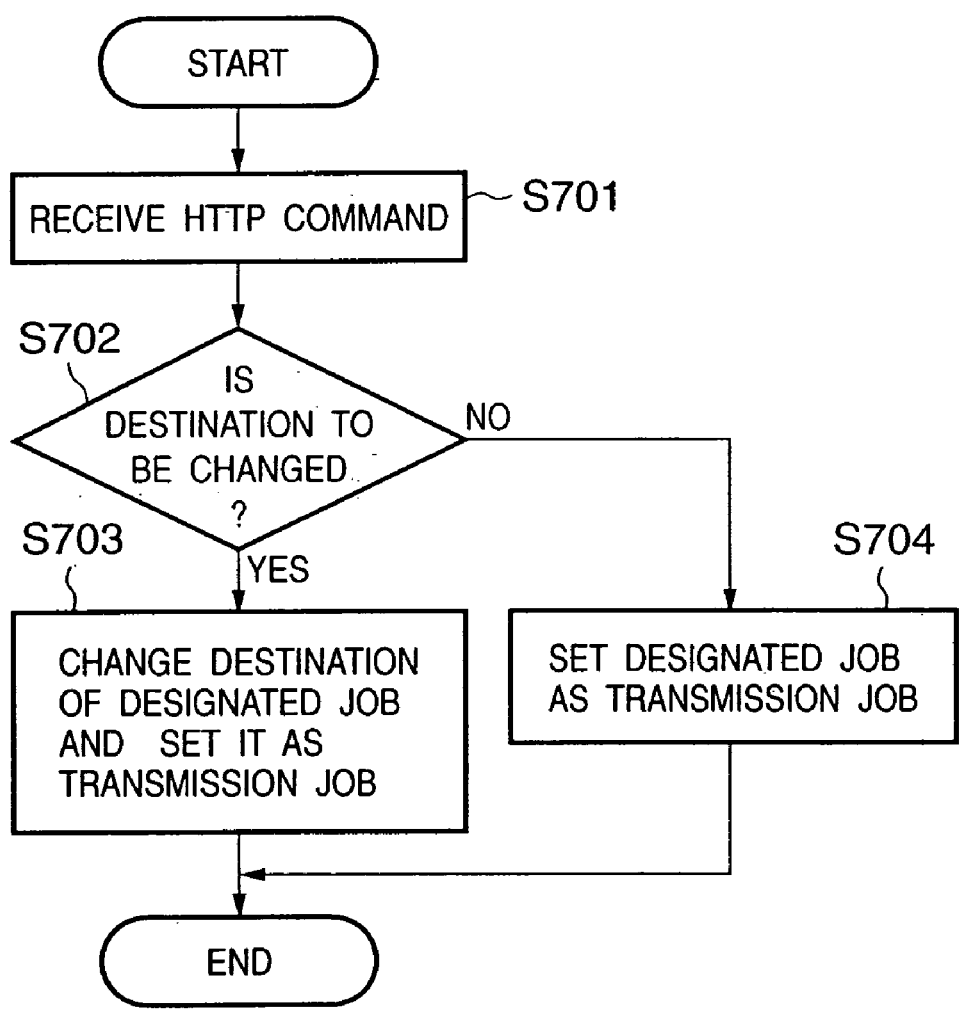

FIG. 31 is a flow chart showing the flow of processing to be executed when a transmission job that has already been executed is retransmitted upon a destination change.

First of all, the user designates a desired job (that has been executed) on the window in FIG. 28 by using the Web browser of the host computer 10, and generates an instruction to perform retransmission after, for example, a destination is changed or added as needed. The Web server 1503 receives an HTTP command indicating this instruction content in step S701.

If it is determined in step S702 that this instruction content contains a destination change, the destination of the designated job is changed, and the resultant job is set as a transmission job (transmission queue). If no destination change is contained, the designated job is set as a transmission job without changing the destination in step S704.

Figure 32:
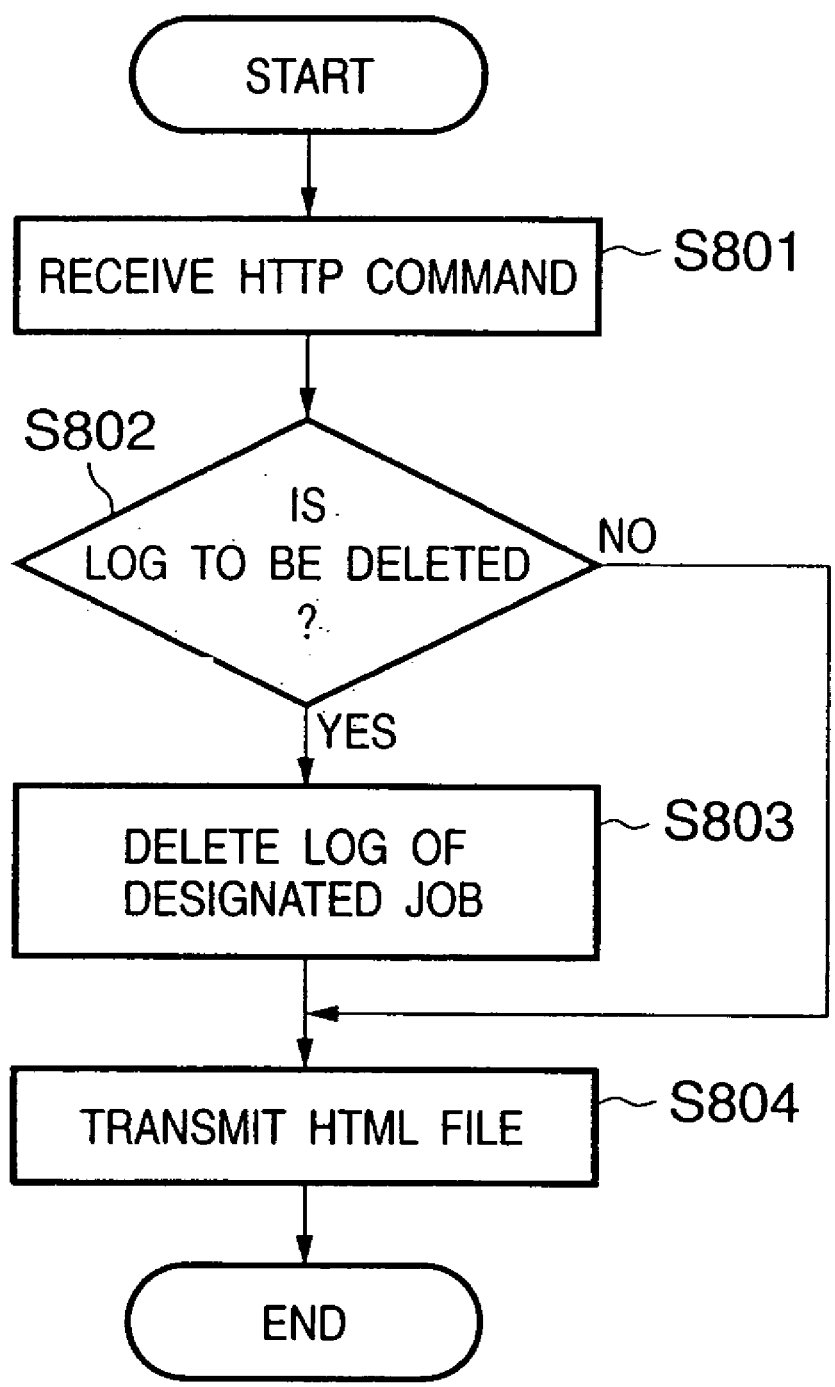

FIG. 32 is a flow chart showing the flow of processing to be executed when a log of jobs that have been executed is deleted from "Send Job Log" in accordance with an instruction from the user.

First of all, the user designates a desired job on the window in FIG. 28 by using the Web browser of the host computer 10, and generates an instruction to delete the corresponding log. In this case, user authentication may be performed to inhibit deletion of a log associated with another person. The Web server 1503 receives an HTTP command indicating this instruction content in step S801.

If it is determined in step S802 that an instruction to delete a log is received, the log of the designated job is deleted in step S803. If it is determined that no delete instruction is received, this processing is skipped.

In step S804, an HTML file in which the above processing is reflected is transmitted, and the processing is terminated.

The above operation from the remote UI can be also be performed from an operation unit 2012 in the same manner.

As described above, according to the third embodiment, the Web server 1503 is implemented on the image processing apparatus, and the HTTP protocol is used as a protocol between the image processing apparatus and the host computer. This makes it possible to transmit the status information of a plurality of output jobs, which are reserved to be output in the image processing apparatus, as an HTML document from the image processing apparatus to the host computer. The user can browse and operate the status of a plurality of output jobs by using the Web browser on the host computer, thereby easily performing remote control. In addition, a system having high connection performance can be built owing to the high versatility of the HTTP protocol.

In addition, the user can recheck the status and destination of a job through the browser, and can also change them. The user can therefore change the destination of a job as in operation from the operation unit 2012 without directly operating the image processing apparatus.

Even if there is a job that takes much time to start transmission after a transmission instruction is output from the operation unit 2012, the user can check the status of this job at a remote place from the apparatus. In addition, even if the job terminates abnormally, including an operation error, retransmission processing can be performed.

Furthermore, if the user does not want to leave a log of transmission jobs that have been executed, he/she can easily delete the log at a remote place.

The above embodiment uses the Web server installed in the image processing apparatus including the scanner unit as an image input device, the printer unit as an image output device, the controller unit, and the user interface unit. However, by installing a Web server even in an image processing apparatus made up of a printer unit and controller unit, a remote user interface function can be implemented, and print job status can be displayed. In this case, however, the print job type includes only PDL print.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

What is claimed is:

1. A copying apparatus comprising:
   an image scanner, adapted to scan a document and to generate data representing an image on the scanned document;
   a communication unit, adapted to receive data through a network;
   a printer, adapted to print an image based on input data;
   a processor, adapted to perform a plurality of jobs including print jobs performed by using said printer;
   a management unit, adapted to manage information about the jobs performed by said processor, the information including (i) respective types of the print jobs which include a print of an image based on the data from said communication unit and a local copy which prints an image based on the data from said image scanner equipped by said copying apparatus, and (ii) status information regarding each of the print jobs, which indicates whether each of the print jobs is waiting to be performed or is being performed;
   a sorting unit, adapted to sort jobs performed by said processor in accordance with types of jobs;
   a generating unit, adapted to generate a Web page indicating a list of the print jobs and the status information managed by said management unit;
   a transmitter, adapted to transmit the Web page generated by said generating unit to a Web browser;
   a receiver, adapted to receive a request from the Web browser; and
   a controller, adapted to control said management unit so as to change the status information of at least one of the print jobs managed by said management unit in a case where the request received by said receiver indicates that the status information is to be changed,
   wherein said generating unit generates the Web page on the basis of sorting performed by said sorting unit.

2. The apparatus according to claim 1, wherein said generating unit generates a Web page according to HTML.

3. The apparatus according to claim 1, wherein said transmitter transmits a Web page according to HTTP.

4. The apparatus according to claim 1, further comprising storage, adapted to store data processed by jobs performed by said processor,
   wherein said generating unit generates a Web page indicating information about the data stored in said storage.

5. The apparatus according to claim 1, further comprising a sender, adapted to send data stored in said storage in accordance with the request received by said receiver.

6. The apparatus according to claim 1, wherein said management unit rewrites managed information in accordance with the request received by said receiver.

7. A control method for a data processing system including a copying apparatus which has a Web server function and can perform a plurality of jobs including print jobs for image data from an image scanner and image data received through a communication unit from a sender on a network, and a client terminal having a Web browse function, said method comprising the steps of:
   causing the copying apparatus to manage information about the print jobs including
      (i) respective types of the print jobs which include a print of an image based on the data from said communication unit and a local copy which prints an image based on the data from said image scanner equipped by said copying apparatus, and
      (ii) status information of the print jobs, which indicates whether each of the print jobs is waiting to be performed or is being performed,
   sort performed jobs in accordance with types of jobs,
   generate a Web page indicating a list of the print jobs and the status information managed in said managing step, wherein the Web page is generated on the basis of sorting performed in said sorting step, and
   transmit the generated Web page to said client terminal; and
   causing the client terminal to
      receive the Web page from the copying apparatus,
      give an instruction to the copying apparatus to change the status information of one of the print jobs based on the received Web page, and
      transmit the instruction to the copying apparatus; and
   causing the copying apparatus to
      receive the instruction from the client terminal, and
      change the managed status information of one of the print jobs in accordance with the received instruction.

8. A control method for a copying which has an image scanner for scanning a document to generate data representing image on the scanned document, a printer for printing image and a communication unit for receiving data from a sender on a network, comprising the steps of:
   managing information about a plurality of print jobs, executed by the printer of the copying apparatus, including (i) respective types of the print jobs which include a print of an image based on the data from said communication unit and a local copy which prints an image based on the data from the image scanner equipped by said copying apparatus, and (ii) status information of the print jobs, which indicates whether each of the print jobs is waiting to be performed or is being performed;

sorting the jobs in accordance with types of jobs;
generating a Web page indicating a list of the print jobs and the status information managed in said managing step on the basis of the managed information, wherein the Web page is generated on the basis of sorting performed in said sorting step;
transmitting the Web page generated in said generating step to the Web browser;
receiving a request from the Web browser; and
changing the status information of at least one of the print jobs managed in said managing step in a case where the request received in said receiving step indicates that the status information is to be changed.

9. A computer program product comprising a computer readable medium storing computer program code for controlling a copying apparatus which has an image scanner for scanning a document to generate data representing image on the scanned document, a printer for printing image and a communication unit for receiving data from a sender on a network, said product comprising process procedure code for:

managing information about a plurality of print jobs, executed by the printer of the copying apparatus, including (i) respective types of the print jobs which include a print of an image based on the data from said communication unit and a local copy which prints an image based on the data from the image scanner equipped by said copying apparatus, and (ii) status information of the print lobs, which indicates whether each of the plurality of print jobs is waiting to be performed or is being performed;

sorting the jobs in accordance with types of jobs;
generating a Web page indicating a list of the print jobs and the status information managed in said managing step on the basis of the managed information, wherein the Web page is generated on the basis of sorting performed in said sorting step;
transmitting the Web page generated in said generating step to the Web browser;
receiving a request from the Web browser; and
changing the status information of at least one of the print jobs managed in said managing step in a case where the request received in said receiving step indicates that the status information is to be changed.

* * * * *

UNITED STATES PATENT AND TRADEMARK OFFICE
CERTIFICATE OF CORRECTION

PATENT NO. : 7,120,910 B2
APPLICATION NO. : 09/818558
DATED : October 10, 2006
INVENTOR(S) : Hiroshi Matsuda et al.

It is certified that error appears in the above-identified patent and that said Letters Patent is hereby corrected as shown below:

TITLE PAGE:
Item (56) References Cited Foreign Patent Documents (page two)
"11289413 4/1998" should read -- 11-289413 4/1999 -- and
"A-11-175445" should read -- 11-175445 --.

DRAWINGS:
Sheet 9, Figure 10, "Recieve" should read -- Receive -- and "RecieivedFax" should read -- ReceivedFax --;
Sheet 10, Figure 11, "Recieve" should read -- Receive --;
Sheet 11, Figure 12, "Recieve" should read -- Receive --;
Sheet 17, Figure 18, "transfered," should read -- transferred, --;
Sheet 20, Figure 22, "document" should read -- documents --; and
Sheet 23, Figure 25, "RecieivedFax" should read -- ReceivedFax --.

COLUMN 5:
Line 34, "deices;" should read -- devices; --; and
Line 39, "devices server" should read -- devices serve --.

COLUMN 15:
Line 44, "terminate" should read -- terminated --.

COLUMN 18:
Line 64, "indicting" should read -- indicating --.

COLUMN 19:
Line 29, "indicting" should read -- indicating --; and
Line 43, "coincides" should read -- coincides with --.

UNITED STATES PATENT AND TRADEMARK OFFICE
CERTIFICATE OF CORRECTION

PATENT NO.       : 7,120,910 B2
APPLICATION NO.  : 09/818558
DATED            : October 10, 2006
INVENTOR(S)      : Hiroshi Matsuda et al.

It is certified that error appears in the above-identified patent and that said Letters Patent is hereby corrected as shown below:

<u>COLUMN 24</u>:
Line 6, "lobs," should read -- jobs, --.

Signed and Sealed this

Twelfth Day of June, 2007

JON W. DUDAS
*Director of the United States Patent and Trademark Office*